United States Patent [19]
Sekine et al.

[11] Patent Number: 6,155,739
[45] Date of Patent: Dec. 5, 2000

[54] TEMPORARY CONNECTION DEVICE FOR UNIVERSAL JOINT

[75] Inventors: Hiroshi Sekine, Takasaki; Hiromichi Komori, Maebashi, both of Japan

[73] Assignee: NSK Ltd., Tokyo, Japan

[21] Appl. No.: 09/100,875

[22] Filed: Jun. 22, 1998

[30] Foreign Application Priority Data

| Jul. 2, 1997 | [JP] | Japan | 9-190727 |
| Nov. 19, 1997 | [JP] | Japan | 9-333747 |
| Dec. 9, 1997 | [JP] | Japan | 9-354083 |
| Dec. 16, 1997 | [JP] | Japan | 9-363288 |
| Jan. 29, 1998 | [JP] | Japan | 10-030331 |

[51] Int. Cl.$^7$ ....................................................... F16D 3/16
[52] U.S. Cl. ............................ 403/12; 403/155; 464/134; 464/901
[58] Field of Search ............................ 403/12, 155, 373, 403/DIG. 14; 464/134, 901, 135; 248/544; 15/250.46

[56] References Cited

U.S. PATENT DOCUMENTS

| 4,009,504 | 3/1977 | Arman | 15/250.46 |
| 4,900,178 | 2/1990 | Haldric et al. | 403/24 |
| 5,253,949 | 10/1993 | Oxley et al. | 403/155 X |
| 5,358,350 | 10/1994 | Oertle | 403/12 |

FOREIGN PATENT DOCUMENTS

| 0 774 399 | 5/1997 | European Pat. Off. |
| 2-35222 | 2/1990 | Japan |
| 8-326767 | 12/1996 | Japan |
| 8-338440 | 12/1996 | Japan |

*Primary Examiner*—Lynne H. Browne
*Assistant Examiner*—Greg Binda
*Attorney, Agent, or Firm*—Vorys, Sater, Seymour and Pease LLP

[57] ABSTRACT

A temporary connecting device for connecting a steering shaft of a vehicle to a universal joint of a steering mechanism. The device comprises a yoke of a universal joint, a shaft to be connected to the yoke, a bolt and a nut for fixing the shaft to the yoke and a clip for temporarily retaining the shaft in the yoke. The clip is composed of a thin plate member having a support portion fixed to one of the tabs of the yoke and a latching portion positioned in the U-shaped groove in a normal state, the latching portion comprising a cam slant portion which is brought into contact with the shaft when the shaft is inserted into a U-shaped groove from an open side thereof in order to connect the shaft to the yoke so as to retract the latching portion from the U-shaped groove by the elastic deformation thereof to allow the shaft to move into the U-shaped groove, and a latching surface portion to be returned into the U-shaped groove after the shaft is inserted into the U-shaped groove so as to temporarily retain the shaft at a predetermined position.

31 Claims, 32 Drawing Sheets

TEMPORARY CONNECTION DEVICE FOR UNIVERSAL JOINT

BACKGROUND OF THE INVENTION

1. Field of the Invention

The present invention relates to a temporary connection device for a universal joint, and in particular, to a clip for preventing separation of a yoke from a shaft in temporary retention.

2. Related Background Art

A steering shaft in a steering device of a motor vehicle is extended from the inside of the vehicle toward the front part of the body thereof. However, it is difficult to install this steering shaft straight for the reason of installing technique. Accordingly, it is usually practiced to divide such steering shaft into plural parts and arrange these plural parts with angles to be connected to each other with a universal joint.

When the steering shaft is connected to the universal joint, it is necessary to insert one end of the steering shaft into a yoke of the universal joint along the axial direction thereof. However, when the shaft has been already installed on the car body for the reason of assembling, it is difficult to slide the shaft In the axial direction. Then, a temporary connection device for connecting the yoke of the universal joint and the shaft in such case has been already proposed.

FIG. 40 is a view for showing an arrangement of connection between the yoke and the shaft according to an art which is disclosed in the U.S. Pat. No. 4,900,178 as the prior art.

Referring to FIG. 40, a yoke (shank) 11 takes a substantially U shape and has tabs 11a, 11b which are extended in parallel. The tabs 11a, 11b are respectively provided with bolt bores 11c, 11d. It should be noted that the yoke 11 is rotatable around the axis X.

The yoke 11 and the shaft 12 are shown as being separated from each other in FIG. 40. However, the shaft 12 is already fixed, and the position of the yoke 11 is also fixed, so that when the shaft 12 is to be inserted into the yoke 11, it is difficult to relatively move the yoke 11 with respect to the shaft 12 in the axial direction.

Accordingly, if the yoke 11 is moved from the state shown in the drawing and rotated around the axis X, mounted on a necessary position as being lifted upward, and then pulled down toward the shaft 12, mutual engagement between the yoke 11 and the shaft 12 becomes possible without relative movement of the yoke 11 and the shaft 12 in the axial direction. After that, a bolt 13 is threadably engaged with a nut 14 and fastened up, whereby the installation of the yoke 11 and the shaft 12 is completed.

Since the lower end of the steering shaft which is to be connected to a shaft. coupling is disposed in an area of an extremely poor accessibility, such as a lower part of the vehicle, it is desired to enhance the accessibility of the connection between the shaft coupling and the steering shaft. However, unless the yoke 11 is disposed at a predetermined position (the inmost part) with respect to the shaft 12, it is impossible to insert the bolt 13 thereto.

In order to avoid such problems, such arrangement as to be described was proposed in the Japanese Patent Application Laid-Open No. 2-35222. FIGS. 41 and 42 are cross-sectional views of the yoke 11 shown in FIG. 40, cut away along a direction perpendicular to the axis of the shaft 12. In these drawings, a clip 15 is mounted on the yoke 11, and the clip 15 presses the outer end surface of a special-form nut 14 with the elasticity thereof. The special-form nut 14 has a slant surface 14a at the inner end thereof.

As shown in FIG. 41, though not engaged with the bolt 13 in a normal state, the special-form nut 14 is pressed by the clip 15 so that the inner end thereof is protruded into the yoke 11. In this case, when the yoke 11 is moved toward the shaft 12, the special-form nut 14 is moved in a direction to press back the clip 15 by the action of the slant surface 14a, as shown in FIG. 41, whereby the shaft 12 is allowed to reach the inmost part of the yoke 11. Once the shaft 12 reaches the inmost part of the yoke 11, the special-form nut 14 returns to its original position, thereby preventing the shaft 12 from falling off from the yoke 11.

FIG. 43 is a view for showing an arrangement of the prior art which is disclosed in the US Patent No. 5,358,350 and similar to that of FIGS. 41 and 42. Referring to FIG. 43, a clip 25 is disposed around a yoke 25 and is provided with a tongue 25a which is protruding in an inwardly inclined manner.

Also according to the prior art shown in FIG. 43, when the yoke 21 is moved toward a shaft 22, the tongue 25a is elastically deformed to move outward, whereby the shaft 22 is allowed to reach the inmost part of the yoke 21. Once the shaft 22 reaches the inmost part of the yoke 21, the tongue 25a returns to its original position, thereby preventing the shaft 22 from falling off from the yoke 21.

The prior art shown in FIGS. 41 and 42 has problems as to be described. Since the special-form nut 14 has a special form as mentioned above, a generally-used nut can not be used as this nut 14. As a result, the manufacturing cost will be increased.

In the case of the prior art shown in FIG. 43, when the tongue 25a returns to its original position after the shaft 22 and the yoke 21 are once assembled, it is difficult to retract the tongue 25a outwardly and separate the yoke 21 from the shaft 22 for the second time. Further, since the clip 25 is wound up to the inner part of the yoke 21 to have the tongue 25a at the tip end thereof, it is necessary to set a gap between the tabs of the yoke 21 to be larger than the shaft 22 at least by the thickness of the clip 25. However, if the gap is set large, a comparatively large space is generated between the yoke 21 and the shaft 22. In this case, it is feared that the fastening power becomes unsatisfactory if the bolt and the nut for fastening (not shown) are fastened up with the same torque, compared with a case in which this space is small.

SUMMARY OF THE INVENTION

Taking such problems into consideration, an object of the present invention is to provide a clip for a yoke having a widely-enhanced workability in a simple structure.

According to one aspect to the present invention, there is provided a connection device for a universal joint which comprises a yoke of a universal joint forming a U-shaped groove with a bottom wall portion thereof and a pair of tab portions extending from the bottom wall portion, a shaft to be inserted into the U-shaped groove of the yoke to connect to the yoke, bores formed opposite to the pair of tabs, a bolt and a nut to be inserted in the bores for securing the shaft which is inserted in the U-shaped groove so as to fasten up the tabs, and a clip for temporarily retaining the shaft in the U-shaped groove of the yoke when the yoke and the shaft are connected to each other, wherein the clip is a thin plate member having a support portion fixed to one of the tabs of the yoke and a latching portion positioned in the U-shaped groove in a normal state, the latching portion comprises a cam slant portion which is brought into contact with the shaft when the shaft is inserted into the U-shaped groove from an open side thereof in order to connect the shaft to the yoke portion so as to retract the latching portion from the U-shaped groove by the elastic deformation thereof to allow the shaft to move into the U-shaped groove, and a latching surface portion to be returned into the U-shaped groove after the shaft is inserted into the U-shaped groove so as to temporarily retain the shaft at a predetermined position.

Preferably, the clip is provided with a clip main body extended along the bottom wall portion of the yoke and the outer surface of the tabs and having first and second side walls along the tabs, the first side wall of the clip main body has a portion sandwiching the corresponding tab to constitute the support portion, the first and second side walls are respectively provided with insertion bores for inserting the bolt in alignment with the above-mentioned bores, and the latching portion is formed on the second side wall to be protruding into the U-shaped groove.

According to another aspect of the present invention, there is provided a clip serving as a temporary connection device of a yoke which is mounted on a yoke comprising a fit portion for installing a shaft, a pair of tabs extended in parallel from the fit portion, and bolt insertion bores respectively formed on said tabs, which clip further comprises:

a main body extending along the outer surface of the yoke to be mounted on the yoke; and protrusions protruding from the main body into between the tabs, wherein the protrusions are drawn into the bolt insertion bores to allow the shaft to pass when the shaft is passed through between the tabs to be mounted on the fit portion of the yoke. However, the arrangement is such that after the shaft is mounted on the fit portion, the shaft is prevented to be separated from the yoke.

According to still another aspect of the present invention, there is provided a universal joint for temporarily retaining a shaft in a U-shaped groove by use of a clip which is attached to the yoke in advance, when the shaft is inserted into the U-shaped groove of the yoke formed of a pair of tabs so as to be connected to the yoke, wherein the clip is provided with at least one protruding piece which is extended from the end surface of the tab toward the U-shaped groove and is retracted when the shaft is inserted into this U-shaped groove and returns to its original position after the shaft is stored in the U-shaped groove, and sandwich pieces which are extended along the end surfaces of the tabs from this protruding piece so as to sandwich the tabs therebetween.

According to still another aspect of the present invention, there is provided a universal joint for temporarily retaining a shaft in a U-shaped groove by use of a clip which is attached to the yoke in advance, when the shaft is inserted into the U-shaped groove of the yoke formed of a pair of tabs so as to be connected to the yoke, wherein the clip is provided with a clip main body which is sandwiched by and between a nut secured to a nut bore of one of the tabs and an outer wall surface of the tab or which is engaged with the nut to be provided on the outer wall surface of the tab, and protruding pieces which are extended toward the U-shaped groove from the clip main body along the thicker-part surfaces of the tabs, and is retracted when the shaft is inserted into this U-shaped groove while returning to its original position after the shaft is stored in the U-shaped groove.

As described above, according to the present invention, the clip is arranged not to fall off from the yoke easily. Moreover, the protruding piece which is extended from the clip main body toward the U-shaped groove is retracted when the shaft is inserted into the U-shaped groove, and returns to its original position after that shaft is stored in the U-shaped groove, so that the shaft can be securely retained temporarily in the yoke, the workability thereof can be conspicuously improved, and the manufacturing cost can be reduced. In addition, since requiring a small work space for assembling the shaft, the present invention can be applied even to a steering shaft of a motor vehicle having a small working space.

DESCRIPTION OF THE PREFERRED EMBODIMENTS

Figure 1:
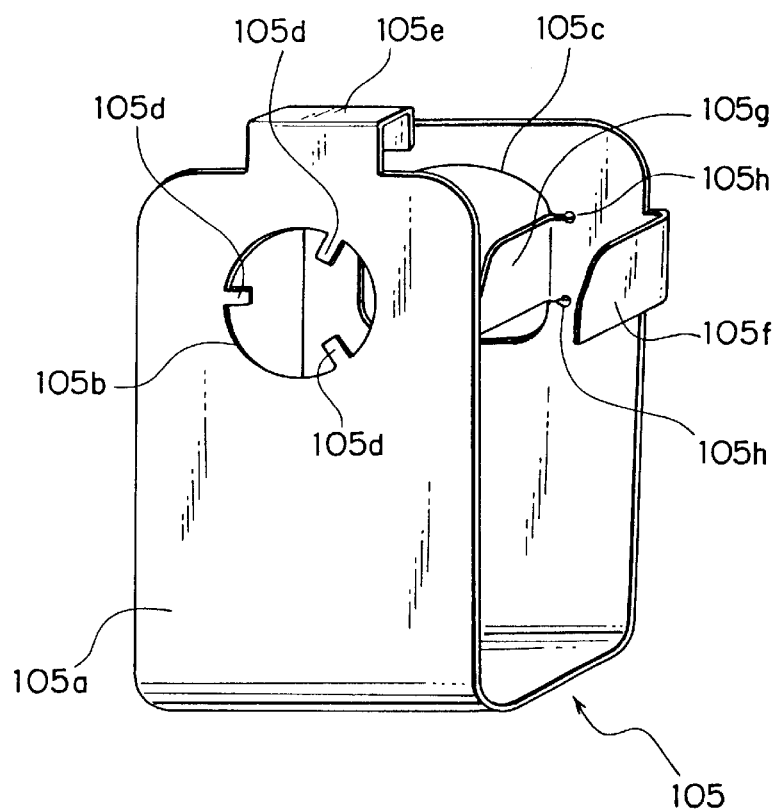
FIG. 1 is a perspective view showing a clip of a temporary connection device for a universal joint according to the first embodiment of the present invention.
Figure 2:
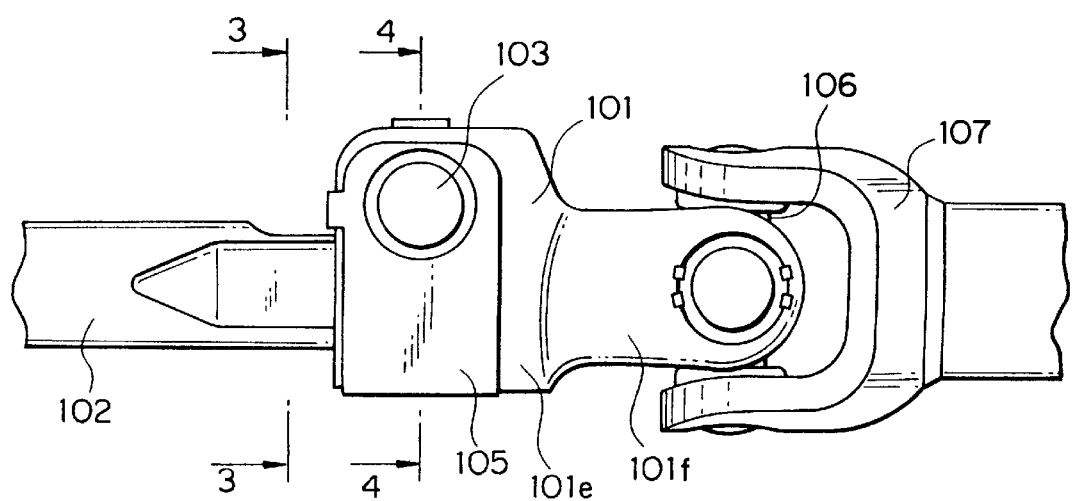
FIG. 2 is a side view showing a universal joint using the yoke to which the clip according to the first embodiment is attached, in a state in which the universal joint is attached to a shaft.
Figure 3:
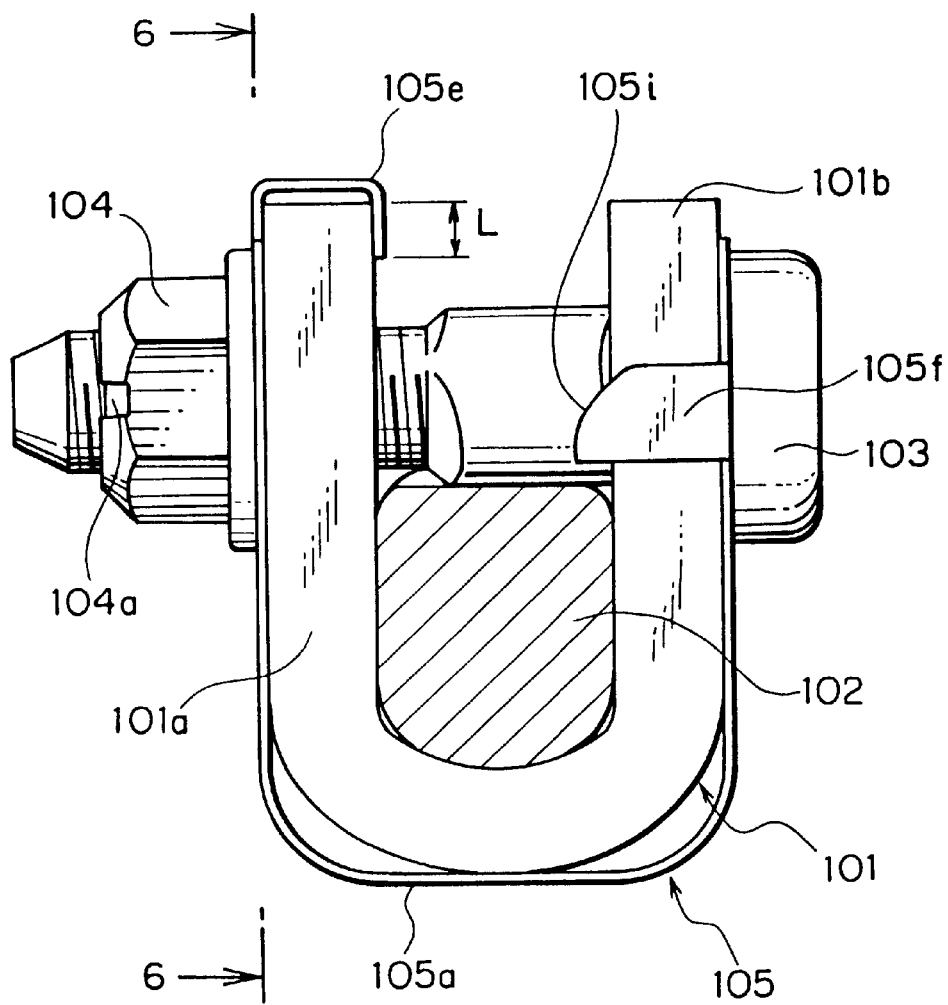
FIG. 3 is a view of the yoke of FIG. 2, cut away along the line 3—3, seen from the direction of arrow.

Embodiments of the present invention will be described below with reference to the drawings. FIG. 1 is a perspective view for showing a clip of a yoke of a temporary connection device for a universal joint according to the first embodiment. FIG. 2 is a side view for showing a universal joint which uses a yoke to which the clip according to the first embodiment is attached, in a state in which the universal joint is attached to the shaft. FIG. 3 is a view of the yoke of FIG. 2, cut-away along the line 3—3 and seen from the direction of arrow.

Figure 4:
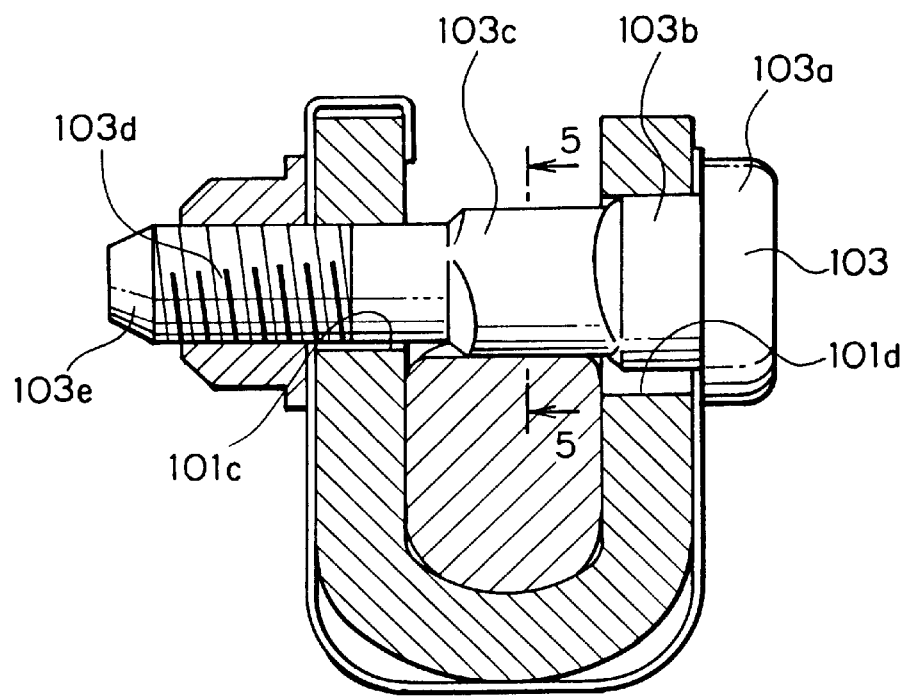
FIG. 4 is a view of the yoke of FIG. 2, cut away along the line 4—4, seen from the direction of arrow.
Figure 5:
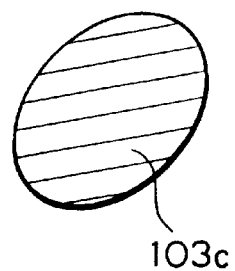
FIG. 5 is a view of a bolt of FIG. 4, cut away along the line 5—5, seen from the direction of arrow.
Figure 6:
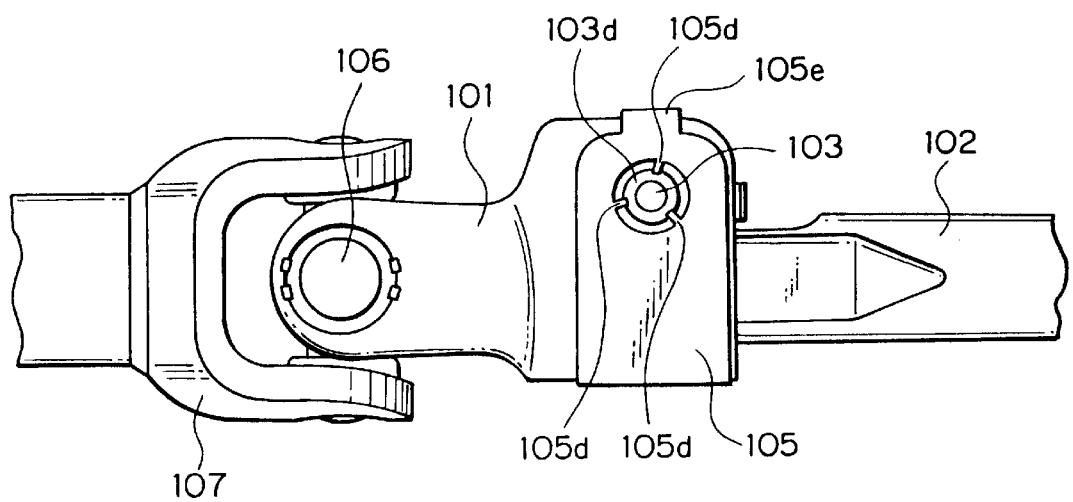
FIG. 6 is a side view of the universal joint according to the first embodiment, showing the opposite side to that in FIG. 2.
Figure 7:
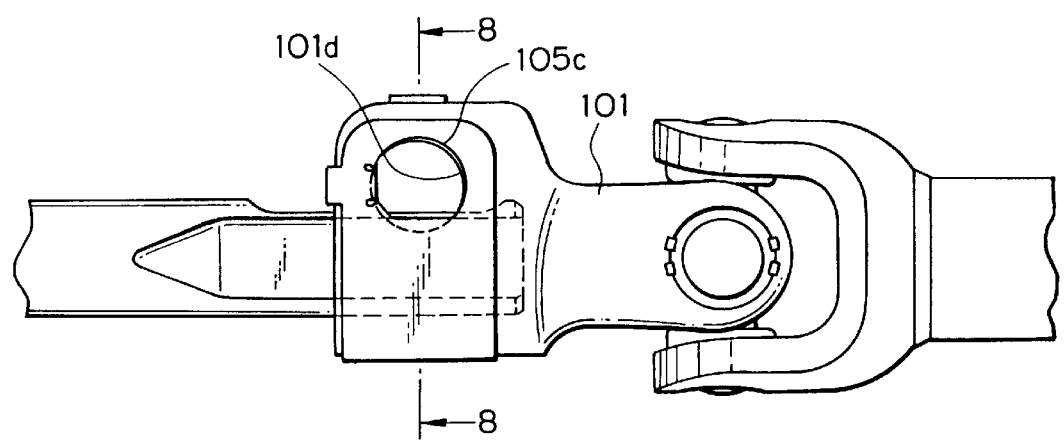
FIG. 7 is a view for showing the universal joint of FIG. 2, in a state in which the bolt has been removed.
Figure 8:
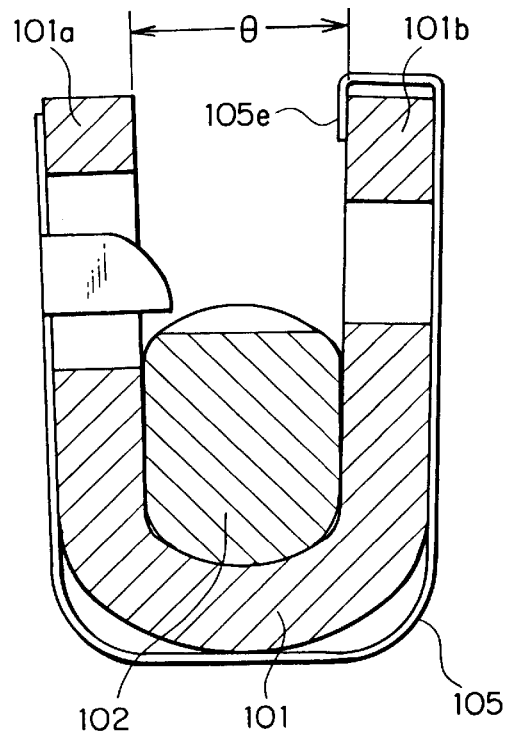
FIG. 8 is a view of the yoke in FIG. 7, cut away along the line 8—8, seen from the direction of arrow.

Further, FIG. 4 is a view of the yoke of FIG. 2, cut-away along the line 4—4 and seen from the direction of arrow. FIG. 5 is a view of a bolt of FIG. 5, cut-away along the line 5—5 and seen from the direction of arrow. FIG. 6 is a side view of the universal joint according to the present embodiment, on the side opposite to that shown in FIG. 2. FIG. 7 is a view for showing the universal joint of FIG. 2 in a state in which the bolt has been removed therefrom. FIG. 8 is a view of the yoke in FIG. 7, cut-away along the line 8—8 and seen from the direction of arrow.

Referring to FIG. 1, a clip 105 is formed by bending a single thin steel plate by press working. More specifically, the clip 105 has a U-shaped main body 105a. A pair of bolt bores 105b, 105c are formed to pass through the main body 105a from the both sides thereof.

The bolt bore 105b on the nut side is provided with three protrusions 105d on the inner periphery thereof at equal intervals. An installing portion 105e which is U-shaped in cross section is formed on the upper edge of the main body 105a above the bolt bore 105b.

A pair of trapezoid pieces (projecting portions) 105f, 105g are formed in parallel adjacent to the other bolt bore 105c to be extended substantially perpendicularly from the main body 105a. One of the trapezoid pieces 105g is extended from the inner periphery of the bolt bore 105c, while the other trapezoid piece 105f is extended from a side edge of the main body 105a. It should be noted that cutouts 105h for mitigating stress concentration and facilitating the bending are formed at the joint between the trapezoid piece 105g and the main body 105a.

As shown in FIGS. 2 and 3, a steering shaft 102 in a steering apparatus of a motor vehicle is fitted in a yoke 101, and this yoke 101 is connected to another yoke 107 through a cross shaft 106. The yoke 101 is composed of a fit portion 101e in which the shaft 102 is fitted, and an arm portion 101f to be connected to the cross shaft 106. These parts are formed in one piece by press-working.

In this fit portion 101e, a U-shaped groove which is U-shaped in cross section corresponding to the shape of the shaft 102 is formed with a bottom wall portion 101g and a pair of tabs 110a, 101b, as shown in FIGS. 3 and 4. Further, the fit portion 101e is moved and rotated from the lower part when the shaft 102 is normally in a still state, whereby the shaft 102 is inserted into the U-shaped groove of the fit portion 101e.

Referring to FIG. 3, the clip 105 is attached in such a manner that the main body 105a thereof winds around the outer periphery of the yoke 101. However, it is arranged that, in the vicinity of the corners of the main body 105a, there are formed spaces between the main body 105a and the outer periphery of the yoke 101, so that the clip 105 is brought into closer contact with the yoke 101 by the elasticity thereof.

In an installed state, an installing/securing portion 105e of the clip 105 is arranged to wind around the upper end of the tab 110a of the yoke 101, and an extended amount thereof from the upper end toward the lower part is set to be L.

It should be noted that the nut 104 which is threadably engaged with the bolt 103 is a caulking nut in which a part 104a of a nut screw portion is caulked. With this nut, the threadable engagement with the bolt 103 becomes more secured so that the bolt is prevented from falling off. Then, the nut 104 and the bolt 103 are rotated together to press the shaft 102.

As clearly seen in FIG. 3, the trapezoid piece 105f has an slant cam portion 105i which is a part of the arch at the tip end thereof. Though not shown in the drawing, the trapezoid piece 105g has a similar slant surface.

Referring to FIG. 4, the bolt 103 is comprised of a head portion 103a, a neck portion 103b, an oval portion 103c, a male screw portion 103d and a tapered portion 103e, which are connected with each other. The inner diameter of the bolt bore 101d of the yoke is larger than the outer diameter of the neck portion 103b, and the inner diameter of the bolt bore 101c is slightly larger than the outer diameter of the male screw portion 103d. As shown in FIG. 5, the oval portion 103c of the bolt 103 is oval-shaped in cross section.

In As shown in FIG. 6, the male screw portion 103d of the bolt 103 is, when inserted into the yoke 101, engaged with the protrusion 105d of the clip 105, so that the bolt 103 is prevented from falling of f or disengaging even when the male screw portion 103d is not threadably engaged with the nut 104 (see FIGS. 3 and 4). It should be noted that an inscribed circle of the protrusion 105d is slightly smaller than the outer diameter of the bolt male screw 103d. Though three protrusions 105d are formed on the clip 105 in the first embodiment, it is possible to prevent the bolt 103 from falling off or disengaging if there is one protrusion 105d or more.

As shown in FIG. 7, in a state in which the clip 105 is attached to the yoke 101, the bolt bore 105c of the clip 105 and the bolt bore 101d of the yoke 101 are slightly shifted. More specifically, the bolt bore 105c of the clip 105 is slightly shifted with respect to the bolt bore 101d of the yoke 101 to the upper right in FIG. 7. As a result, the yoke 101 is in a state of being exposed from the bolt bore 105c in the first quadrant.

The reason for this is when the nut 104 is fastened up with respect to the bolt 103, the neck portion 103b of the bolt 103 is strongly urged in the first quadrant, so that if the clip 105 is present in this case, the clip 105 is pressed by the bolt 103 and deformed. As a result, a stable fastening may not be carried out. It should be noted that in the case of the left hand screw, the yoke 101 is to be exposed from the bolt bore 105c in the second quadrant.

As shown in FIG. 8, the tabs 101a, 101b of the yoke 101 are not completely parallel to each other, but the yoke 101 is slightly open wider in the upper part thereof. An angle θ between the tabs 101a and 101b in the first embodiment is about 2 degrees. Such angle serves to cause the yoke 101 to easily store the shaft 102 even when the installing portion 105e of the clip 105 winds around the upper edge of the tab 101b.

However, since the extended amount L of the installing portion 105e (FIG. 3) is comparatively small, it is not necessary to increase the angle θ or the distance between the tabs much.

Next, an assembling step of the yoke according to the first embodiment will be described below. First, the yoke 101 with the clip 105 attached thereto is fallen down around the horizontal axis of the cross Joint 106 in FIG. 2 to be engaged with the shaft 102.

In this case, the shaft 102 is brought into contact with the slant cam surface 105i of the trapezoid pieces 105f, 105g of the clip 105, whereby the trapezoid pieces 105f, 105g are moved in a direction in which they are separated away from the shaft 102, and when the shaft 102 has passed through, the trapezoid pieces 105f, 105g are returned to their original positions by the elasticity of the clip 105.

Since the lower edges of the trapezoid pieces 105f, 105g are extended horizontally, the separation of the shaft 102 from the yoke 101 is prevented when the trapezoid pieces 105f, 105g are returned to their original positions. It should be noted that the clip 105 is made of a thin plate member and can be easily deformed, so that two trapezoid pieces are provided to secure a stable retaining effect, etc., of the shaft and to prevent the shaft from falling off from the yoke 101.

After that, the bolt 103 is inserted into the bolt bores 101c, 101d of the yoke 101. As described above, if the protrusions 105d of the clip 105 are retained by the male screw portion 103d of the bolt 103, the bolt 103 becomes resistant to falling off or disengaging.

When the nut 104 is threadably engaged with the bolt 103 and fastened up, in such condition, the bolt 103 is rotated together with the nut 104 by the resistance of the caulking portion 104a of the nut 104. However, a vicinity of the longer diameter portion of the oval portion 103c of the bolt 103 is brought into contact with the outer periphery of the shaft 102 so as to press the shaft 102 downward, i.e., toward the inner part of the yoke 101. Thus, the shaft 102 and the yoke 101 are centered, irrespective of magnitude of a slide resistance which is generated between the shaft 102 and the yoke 101, so that they do not swing around if rotated.

When it is required to remove the shaft 102 in order to make repair, replacement, or the like, of, for example, a shaft coupling, the trapezoid pieces 105f, 105g of the clip 105 are pushed out from a space between the tabs after the bolt 103 and the nut 104 are disengaged from each other. In this manner, the removal can be easily carried out.

According to the first embodiment, since such clip is employed, it becomes easier to temporarily retain the yoke and the shaft or to temporarily retain the yoke and bolt at the time of assembling, whereby the workability can be conspicuously improved. Also, though the ease of assembly is improved, it becomes also easier to separate the shaft from the yoke. Further, since this clip is provided with a pair of trapezoid pieces, the retaining performance of the shaft becomes excellent. In addition, such clip can be manufactured by press working at a comparatively low cost.

Figure 9:
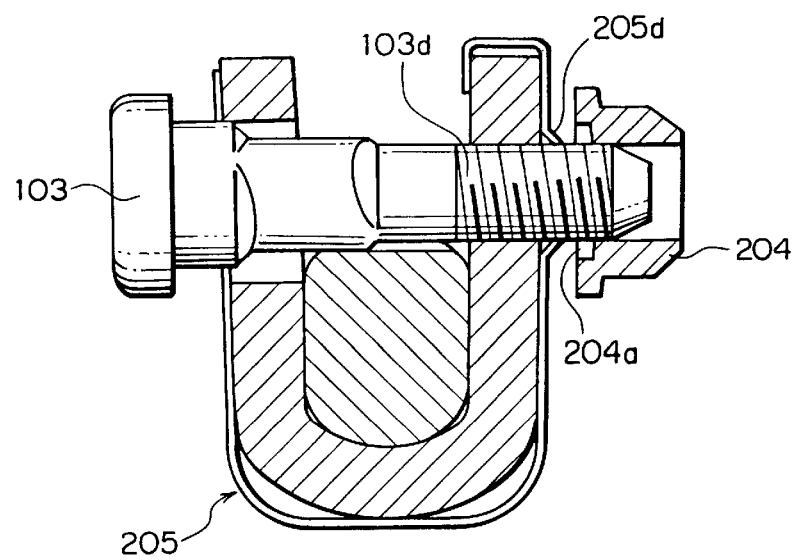
FIG. 9 is a cross-sectional view for showing a clip of a temporary connection device for a universal joint according to the second embodiment of the present invention, in a state in which the clip is attached to a yoke.

FIG. 9 is a cross-sectional view for showing the clip according to the second embodiment in a state in which it is attached to the yoke. It should be noted that description will be made chiefly on the components and arrangements different from those of the first embodiment shown in FIG. 1, and detailed description will be omitted for those common to the two embodiments.

The second embodiment shown in FIG. 9 is different from the first embodiment in the shapes of a clip 205 and a nut 204. More specifically, a protrusion 205d which is formed on a bolt bore 205b of the clip 205 is inclined toward the nut 204. A recess 204a is formed on the end surface of the nut 204 corresponding to the inclined protrusion 205d.

According to the second embodiment, the inclined protrusion 205d is brought into contact with a male screw portion 103d of the bolt 103 to obtain a more satisfactory retaining function. On the other hand, the recess 204a of the nut 204 forms a so-called escape for avoiding contact with such protrusion 205d when the nut 204 is fastened up.

Figure 10:
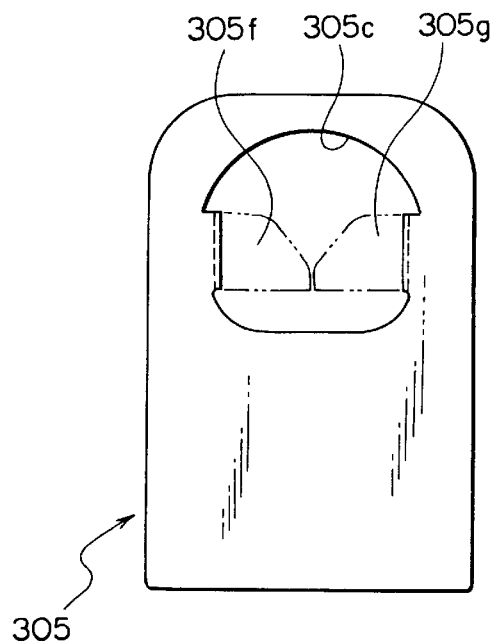
FIG. 10 is a front view of a clip of a temporary connection device for a universal joint according to the third embodiment of the present invention.

FIG. 10 is a front view of a clip according to the third embodiment of the present invention. Also as to the third embodiment, description will be made chiefly on different components and arrangements from the first embodiment shown in FIG. 1, and detailed description will be omitted for common components.

The third embodiment shown in FIG. 10 is different from the first embodiment in the positions at which the trapezoid pieces are formed. More specifically, a clip 305 is provided with trapezoid pieces 305f, 305g which extend from the both sides of the inner periphery of a bolt bore 305c.

A double-dotted chain line shown in FIG. 10 indicates a trapezoid piece after it is punched by a press from a material, but before it is bent. With such arrangement, the material can be used without waste and the manufacturing cost of the clip can be reduced. However, according to such embodiment, the length of the trapezoid pieces 305f, 305g can not exceed the radius of the bolt bore 305c, so that the length can not be made very large. As a result, a yoke to which such clip 305 is attached is required to be comparatively thin.

Figure 11:
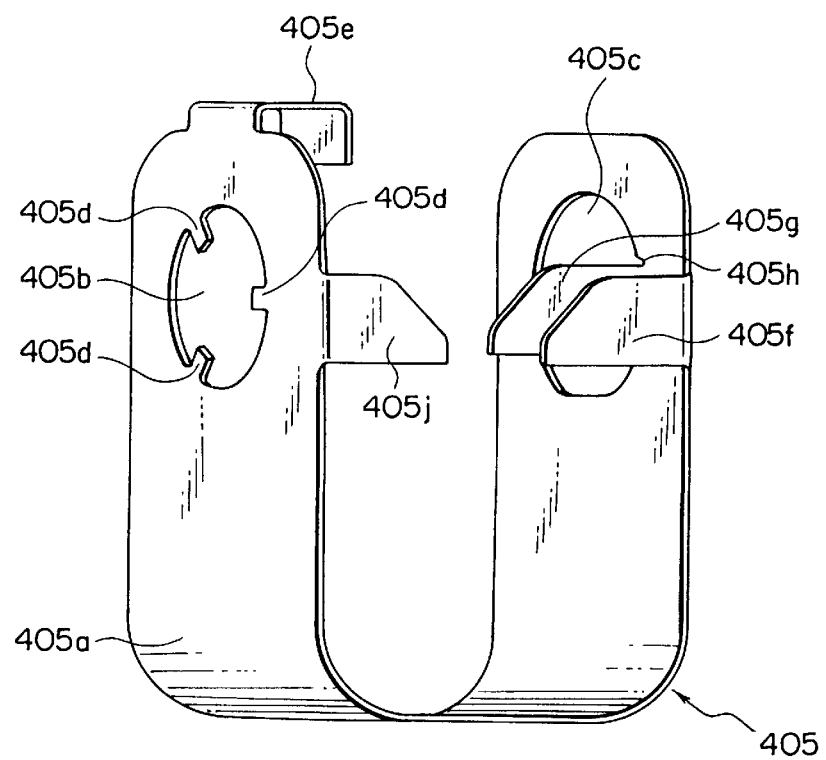
FIG. 11 is a perspective view of a clip of a temporary connection device for a universal joint according to the fourth embodiment of the present invention.
Figure 12:
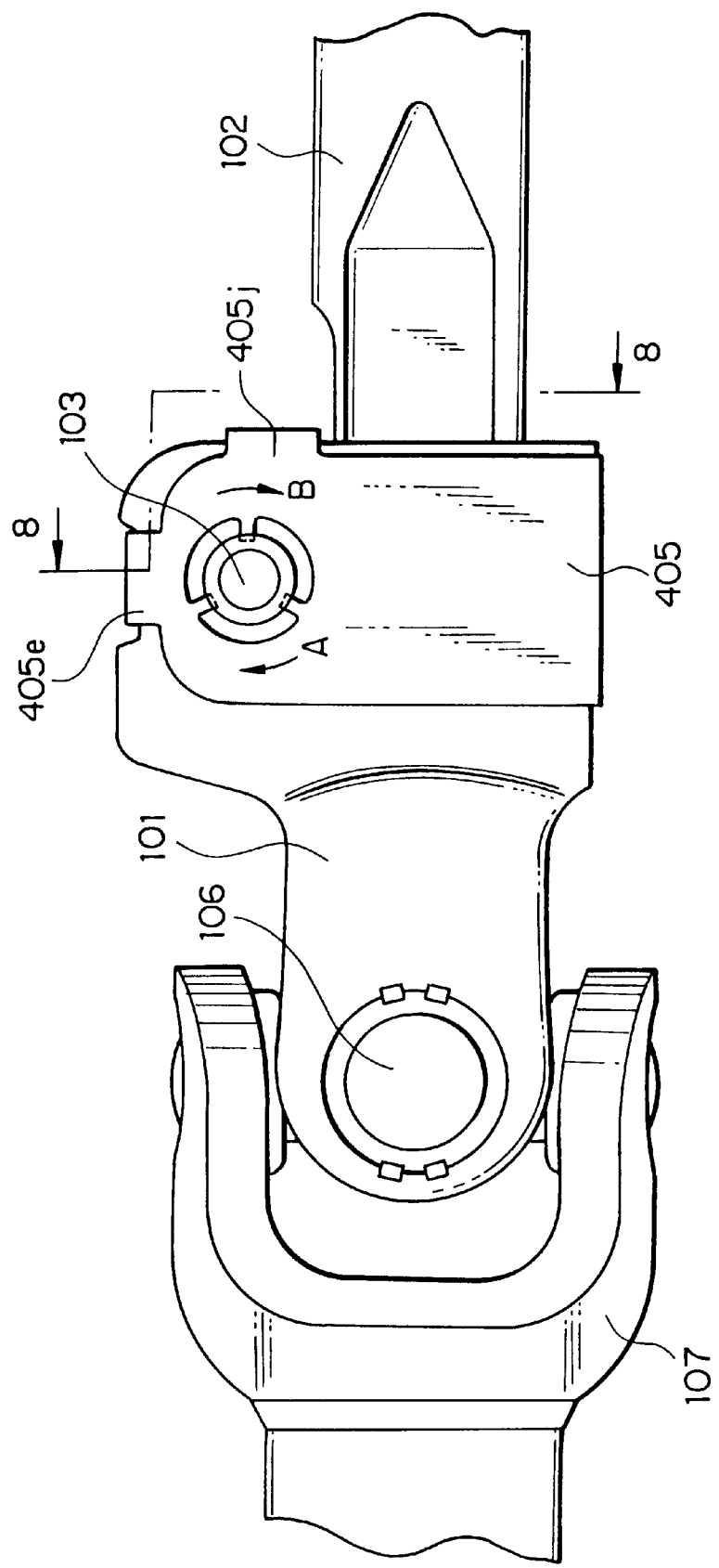
FIG. 12 is a side view for showing a universal joint using the yoke to which the clip according to the fourth embodiment is attached, in a state in which the universal joint is attached to a shaft.
Figure 13:
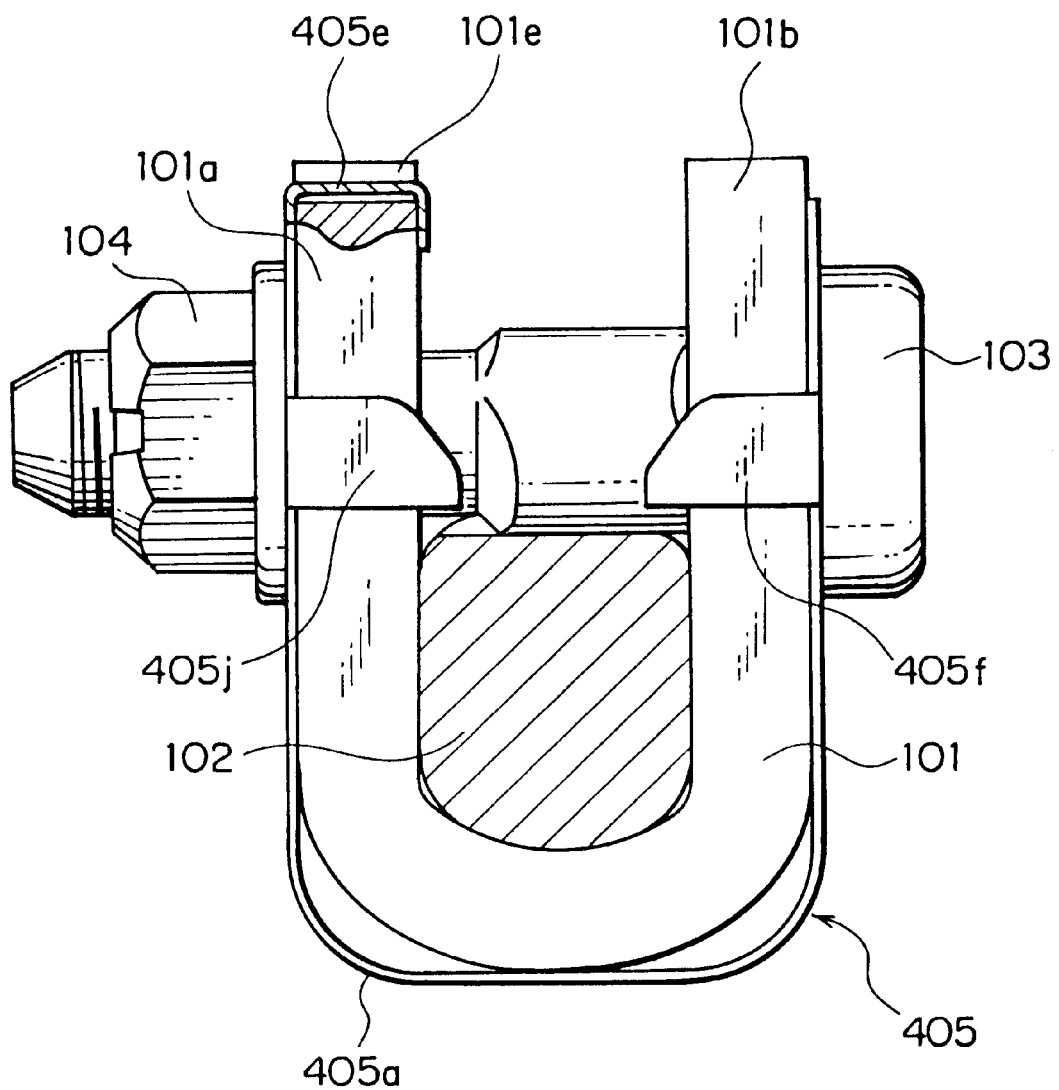
FIG. 13 is a view of the yoke of FIG. 12, cut away along the line 13—13, seen from the direction of arrow.

FIG. 11 is a perspective view of a clip according to the fourth embodiment of the present invention. FIG. 12 is a side view for showing a universal joint to which the clip of FIG. 11 is attached, in a state in which a bolt has been removed. Then, FIG. 13 is an elevational cross-sectional view of the yoke of FIG. 12, cut-away along the line 13—13, and seen from the direction of arrow. It should be noted that also as to the fourth embodiment, description will be made chiefly on different components and arrangements from the first embodiment shown in FIG. 1, and detailed description will be omitted for common components.

The fourth embodiment shown in FIG. 11 is different from the first embodiment chiefly in the number and the positions of the trapezoid pieces. More specifically, like in the first embodiment, a clip 405 is provided with a pair of trapezoid pieces 405f, 405g adjacent to one of bolt bores 405c, which trapezoid pieces are extended in parallel to each other in a sustantially perpendicular direction from a main body 405a. However, adjacent to a bolt bore 405b on the nut side, another trapezoid piece 405j is also extended substantially perpendicularly from the main body 405a. The trapezoid piece 405; has a symmetrical shape with respect to the trapezoid piece 405f, and is extended from a side edge of the main body 405a so as to be opposite to the trapezoid piece 405f. It should be noted that, in this embodiment, as shown in FIGS. 12 and 13, a recess 101e is formed at the center of the upper end of the tab 101a of the yoke 101, and an installing portion 405e is fitted in this recess 101e.

The operation of the fourth embodiment is substantially the same as that of the first embodiment. However, in the fourth embodiment, the shaft 102 can be temporarily retained more securely. That is, the shaft 102 is retained not only by the trapezoid pieces 405f, 405g on the tab 101b side, but also by the trapezoid piece 405j on the tab 101a side, as shown in FIG. 13. As a result, it becomes difficult for the shaft 101 to fall off or disengage when the yoke 101 is caused to carry out the temporary retention. Since the installing portion 405e is fitted in the recess 101e of the tab 101a, there is little possibility for the clip 405 of falling off or removing from the yoke 101 even before the bolt 103 is inserted.

Figure 14:
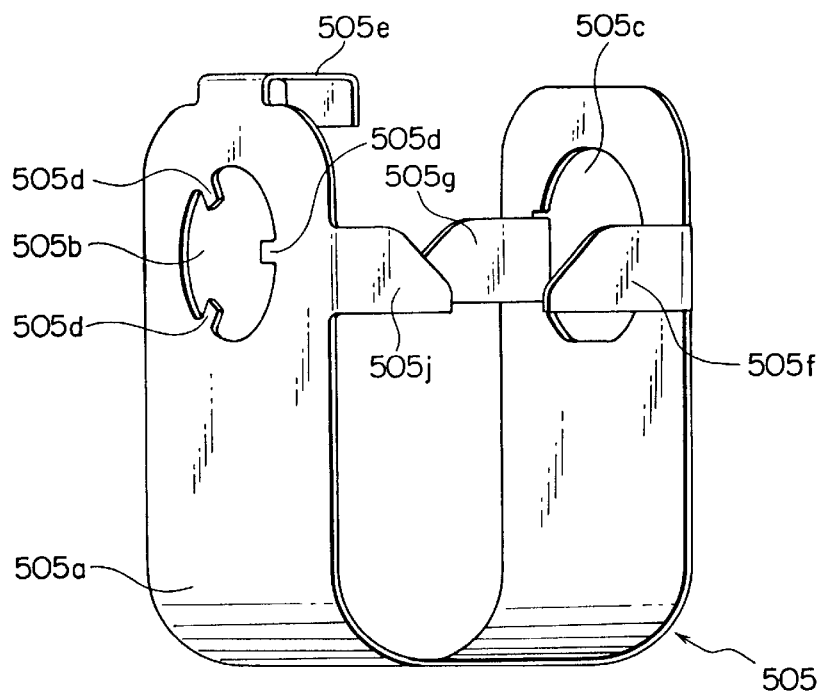
FIG. 14 is a perspective view of a clip of a temporary connection device for a universal joint according to the fifth embodiment of the present invention.

FIG. 14 is a perspective view of a clip of a temporary connection device for a universal joint according to the fifth embodiment of the present invention. Also as to the fifth embodiment, description will be made chiefly on different components and arrangements from the first embodiment shown in FIG. 1, and detailed description will be omitted for common components.

The fifth embodiment shown in FIG. 14 is different from the first embodiment chiefly, in the number and the positions of the trapezoid pieces. More specifically a clip 505 is provided with a pair of trapezoid pieces 505f, 505g adjacent to one of bolt bores 505c, which trapezoid pieces are extended in parallel to each other in a substantially perpendicular direction from a main body 505a. Trapezoid piece 505f is extended from the side edge of main body 505a nearest one side of the inner periphery of bolt bore 505c, while trapezoid piece 505g is adjacent the other side of the inner periphery of bolt bore 505. Since the trapezoid piece 505g is extended from the inner periphery of a bolt bore 505c on the left side in FIG. 14 (the side of the cross joint 106), a distance from the trapezoid piece becomes large. Also, like in the fourth embodiment, there is formed another trapezoid piece 505j, adjacent to a bolt bore 505b on the nut side, to extend substantially perpendicular from the main body 505a.

The operation of the fifth embodiment is substantially the same as that of the fourth embodiment mentioned above. However, according to the fifth embodiment, a distance between the trapezoid piece 505g and the trapezoid piece 505f is wide, so that an inclination of the shaft 102 with respect to the yoke 101 at the time of temporary retention can be reduced to be small. As a result, it becomes easier to insert the bolt 103, and to fasten up the nut 104, whereby the efficiency in the assembling work can be improved.

Figure 15:
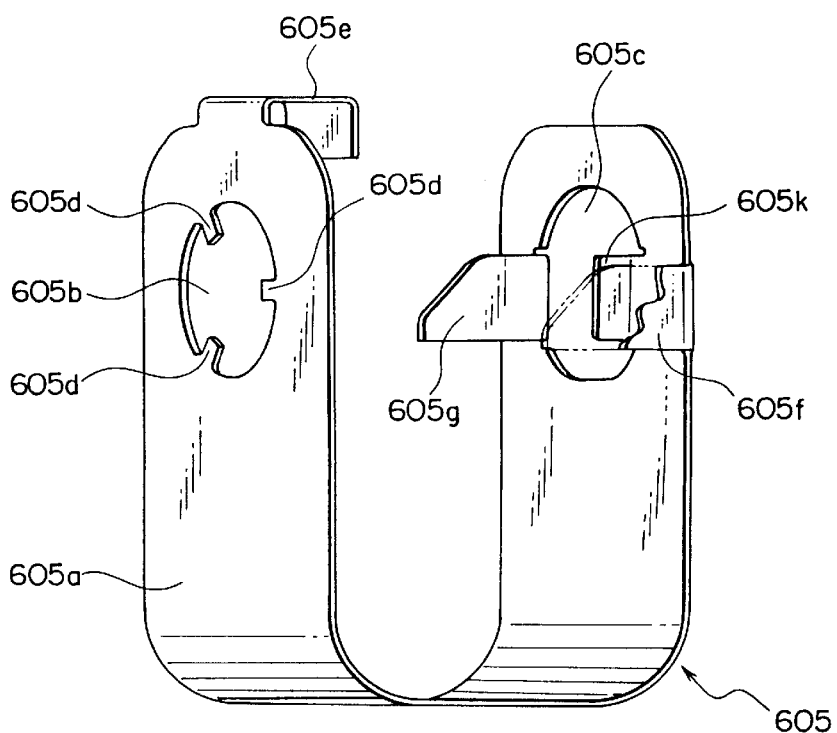
FIG. 15 is a perspective view of a clip of a temporary connection device for a universal joint according to the sixth embodiment of the present invention.

FIG. 15 is a perspective view of a clip of a temporary connection device for a universal joint according to the sixth embodiment of the present invention. Also as to the sixth embodiment, description will be made chiefly on different components and arrangements from the first embodiment shown in FIG. 1, and detailed description will be omitted for common components.

The sixth embodiment shown in FIG. 15 is different from the first embodiment chiefly in the number and the positions of the trapezoid pieces, like in the fourth and fifth embodiments. More specifically, like in the first embodiment, a clip 605 is provided with a pair of trapezoid pieces 605f, 605g adjacent to one of bolt bores 605c, which trapezoid pieces are extended in parallel to each other in a substantially perpendicular direction from a main body 605a. However, the trapezoid piece 605g is extended from the inner periphery of a bolt bore 605c on the left side in FIG. 15, like in the fifth embodiment. There is also formed a comparatively short rectangular piece 605k which is extended from the inner periphery on the right side (on the shaft 102 side) of the bolt bore 605c, substantially perpendicular from the main body 605a.

The operation of the sixth embodiment is substantially the same as that of the fifth embodiment mentioned above. However, according to the sixth embodiment, the tab 101b is sandwiched by and between the rectangular piece 605k and the trapezoid piece 605f when the clip 605 is mounted, so that there is further less possibility for the clip 605 of falling off or disengaging from the yoke 101. It should be noted that a similar arrangement to the trapezoid piece (405j) on the tab 101a side in the fourth embodiment may be added to the configuration of the sixth embodiment.

Figure 16:
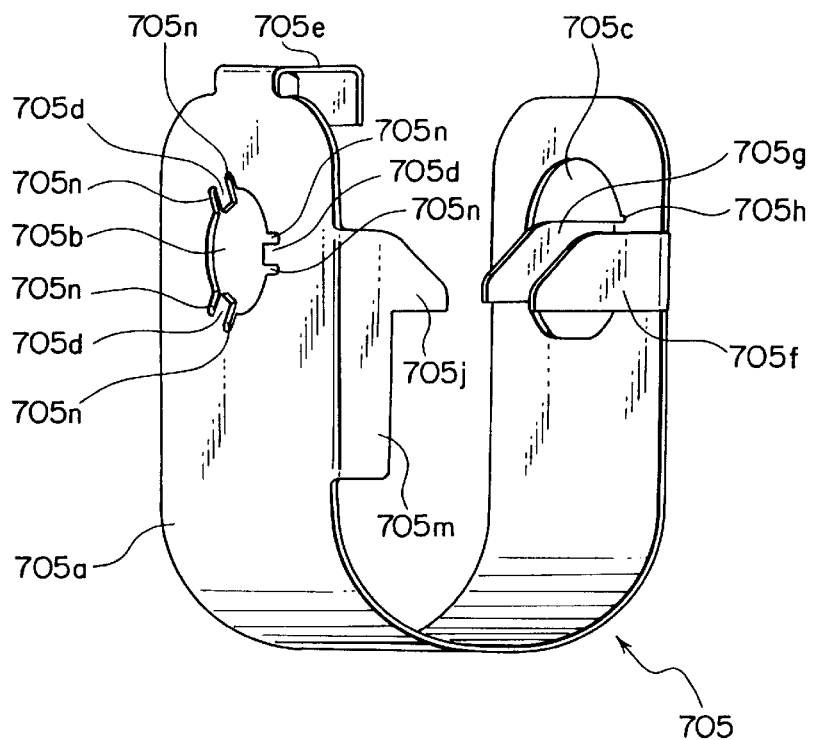
FIG. 16 is a perspective view of a clip of a temporary connection device for a universal joint according to the seventh embodiment of the present invention.
Figure 17:
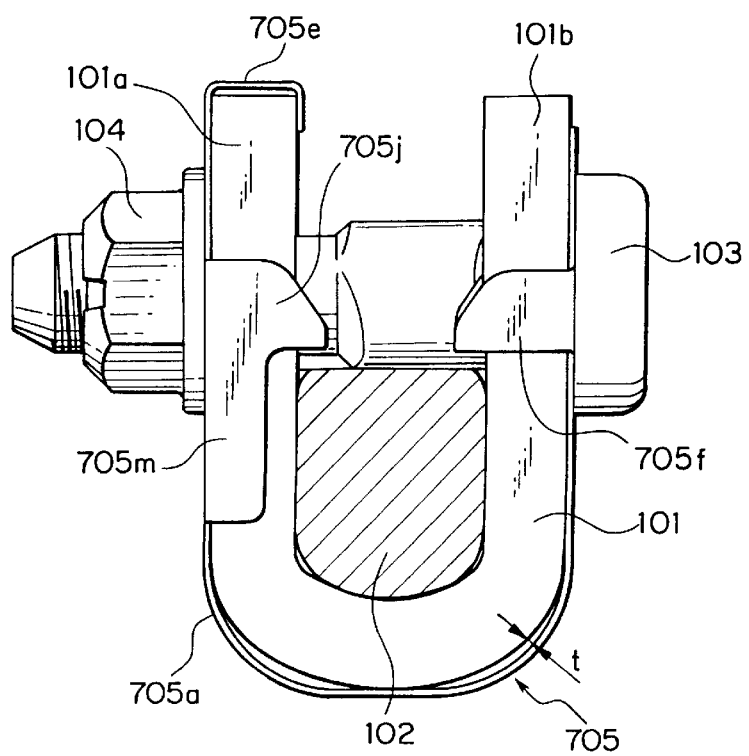
FIG. 17 is a view for showing a yoke to which the clip according to the seventh embodiment is attached, cut away in the same manner as in FIG. 13.

FIG. 16 is a perspective view of a clip of a temporary connection device for a universal joint according to the seventh embodiment of the present invention. FIG. 17 is a view for showing a yoke with the clip of FIG. 16 attached thereto, cut-away in the same manner as in FIG. 13. Also as to the seventh embodiment, description will be made chiefly on different components and arrangements from the first embodiment shown in FIG. 1, and detailed description will be omitted for common components.

The seventh embodiment shown in FIG. 16 is different from the first embodiment chiefly in the number and the positions of the trapezoid pieces. More specifically, like in the first embodiment, a clip 705 is provided with a pair of trapezoid pieces 705f, 705g adjacent to one of bolt bores 705c, which trapezoid pieces are extended in parallel to each other substantially perpendicular from a main body 705a of the clip 705. Further, like in the fourth embodiment, another trapezoid piece 705j is extended substantially perpendicularly from the main body 705a, adjacent to the bolt bore 705b on the nut side. A flange 705m is additionally provided on the lower part of the trapezoid piece 705j in this embodiment, which flange is extended from the side edge of the main body 705a so as to be opposite to the trapezoid piece 705f. Also, in the present embodiment, as shown in FIG. 17, the clip 705 has a smaller distance t from the outer periphery of the yoke 101 in the vicinity of the corner of the main body 705a, compared with that in any of the foregoing embodiments. Further, in the present embodiment, cutouts 705n are formed on the main body 705a respectively on the both sides of the protrusion 705d formed on the bolt bore 705b, whereby the substantial length of each protrusion 705d becomes large.

The operation of the seventh embodiment is substantially the same as that of the fourth embodiment mentioned above. However, according to the seventh embodiment, the flange 705m is additionally provided on the lower part of the trapezoid piece 705j, and the clip 705 has the smaller distance t from the outer periphery of the yoke 101 in the vicinity of the corner of the main body 705a, which effects the following operation. That is, when the nut 104 is fastened up, the main body 705a is bent to be deformed in the directions indicated by the arrows A and B in FIG. 12, due to the accompaniment movement caused by the frictional resistance on the seat surface. This deformation is suppressed when the lower end surface of the trapezoid piece 705j is brought into contact with the upper end surface of the yoke 101. However, in the present embodiment, the deformation is suppressed more effectively since the rigidity of the trapezoid piece 705j is increased by the flange 705m, and an amount of deformation itself is smaller since the distance t is small. Also in the present embodiment, since the substantial length of each protrusion 705d is large so that the rigidity thereof is suppressed to be small, a resistance when the bolt 103 is inserted becomes small. As a result, the assembling workability is improved, compared with any of the foregoing embodiments.

Figure 18:
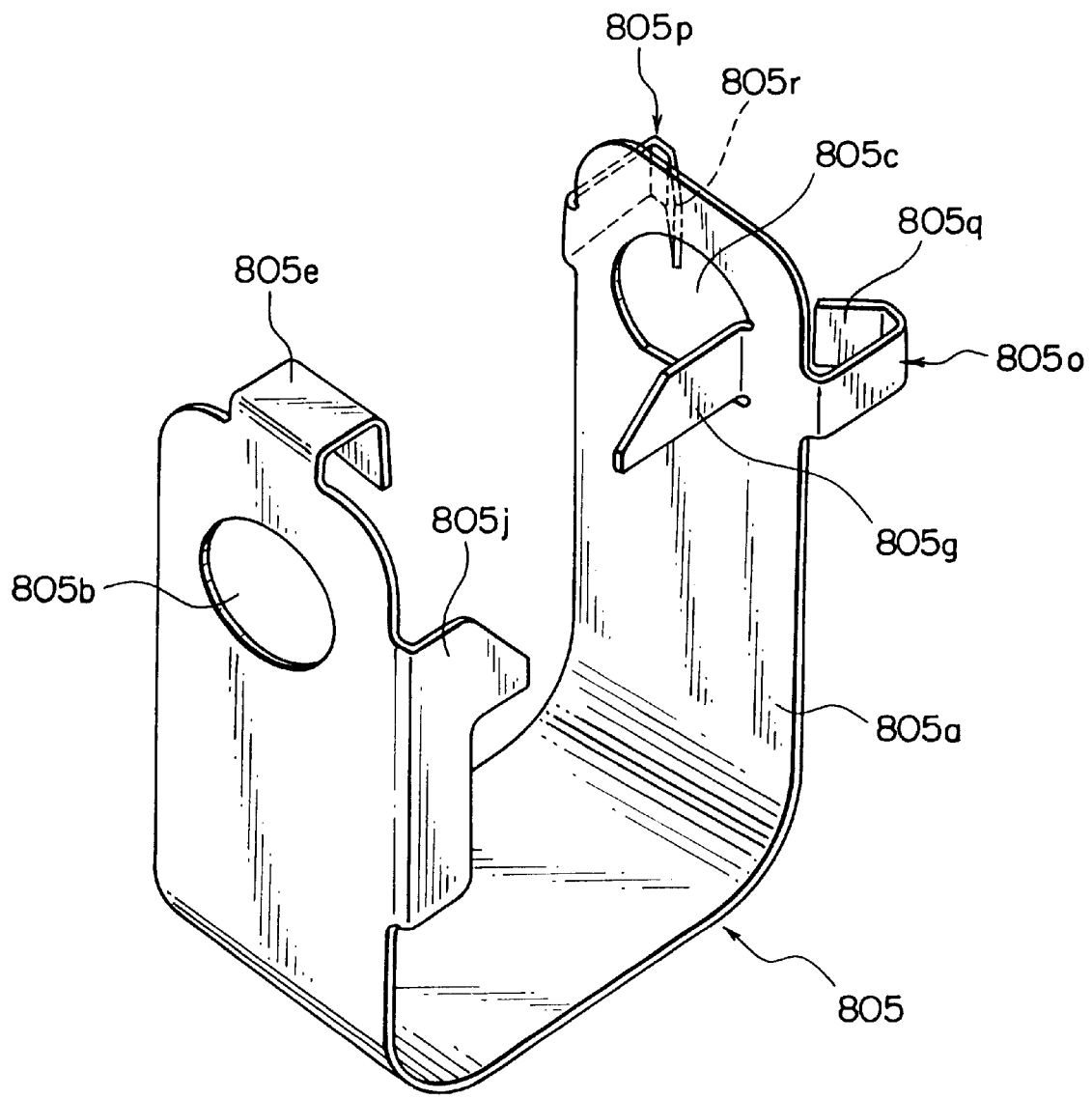
FIG. 18 is a perspective view of a clip of a temporary connection device for a universal joint according to the eighth embodiment of the present invention.
Figure 19:
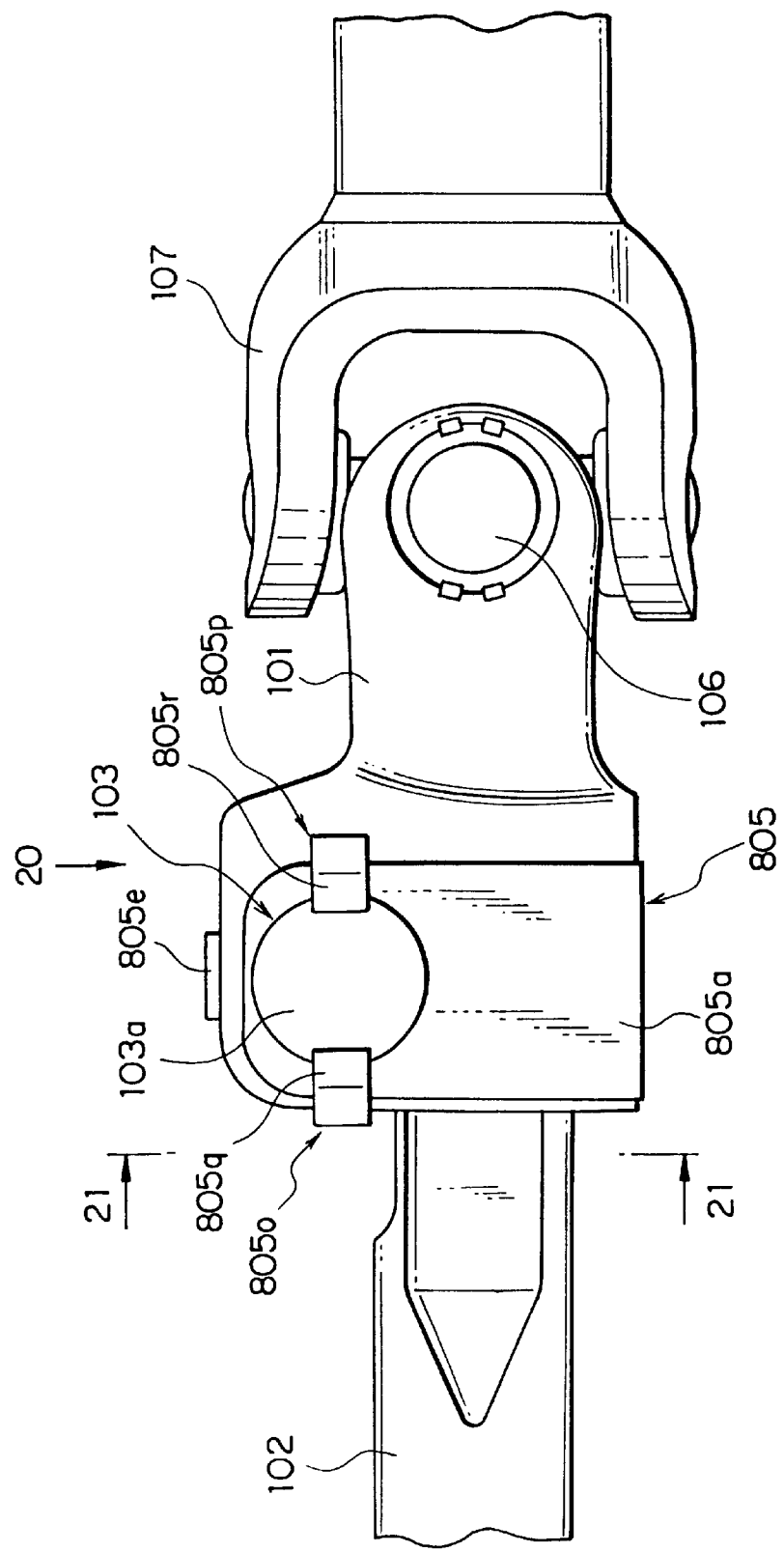
FIG. 19 is a side view for showing a universal joint using the yoke to which the clip according to the eighth embodiment is attached, in a state in which the universal joint is attached to a shaft.
Figure 20:
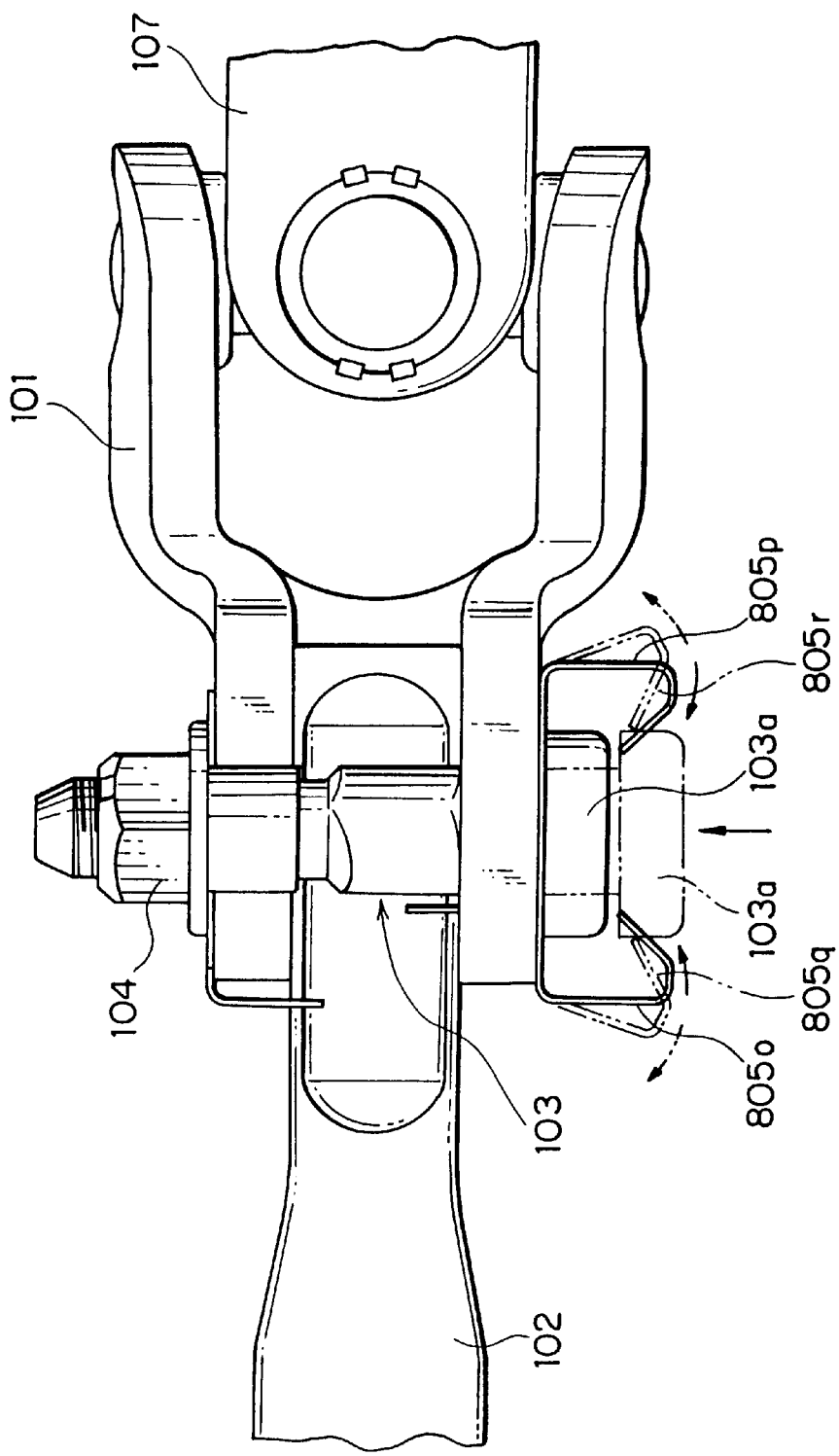
FIG. 20 is a view of the yoke of FIG. 19, seen from the direction 20.
Figure 21:
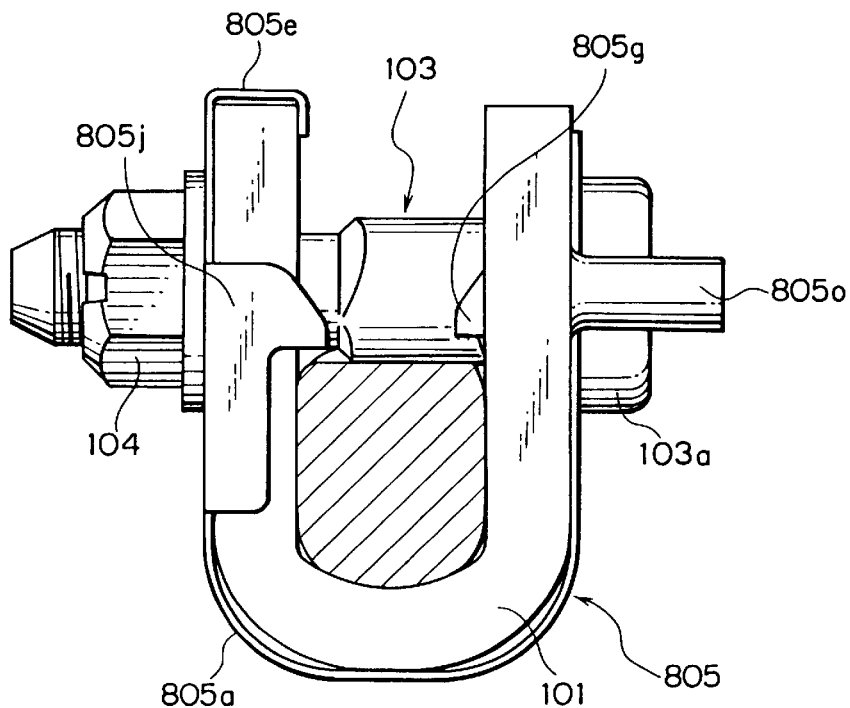
FIG. 21 is a view of the yoke of FIG. 19, cut away along the line 21—21, seen from the direction of arrow.

FIG. 18 is a perspective view of a clip of a temporary connection device for a universal joint according to the eighth embodiment of the present invention. FIG. 19 is a side view for showing a universal joint which employs a yoke with the clip according to the eighth embodiment attached thereto, in a state in which the yoke is mounted on the shaft. Also, FIG. 20 is a view taken along the line 20—20 in FIG. 19, and FIG. 21 is a cross-sectional view taken along the line 21—21 in FIG. 19. It should be noted that description will be made chiefly on different components and arrangements from the first embodiment shown in FIG. 1, and detailed description will be omitted for common components.

The eighth embodiment is different from the first embodiment not only in the number and the positions of the trapezoid pieces, but also in that a bolt temporary retaining pawl is provided. More specifically, a clip 805 is provided with one trapezoid piece 805g which is adjacent to one bolt bore 805c to be extended inward substantially perpendicular from the main body 805a of the clip 805, and another trapezoid piece 805j which has the same shape as that in the seventh embodiment and is adjacent to the bolt bore 805b on the nut side to be extended substantially perpendicular from the main body 805a. Then, the clip 805 is also provided with a pair of bolt retaining pawls 805o, 805p which are formed at the positions corresponding to the right and left sides of the bolt bore 805c to be extended outward from the side edge of the main body 805a. Each of these bolt retaining pawls has a substantially U-shaped form which opens toward the main body 805a, when seen from above, and is inclined in such a manner that a space between latching portions (free end portions) 805q, 805r of the respective pawls becomes narrower inward. Also, the tip end portions of the both latching portions 805q, 805r are formed to have a smaller space therebetween than the head portion 103a of the bolt 103. On the other hand, a space larger than the thickness of the head portion 103a of the bolt 103 is formed with the main body 805a.

The operation of the eighth embodiment is substantially the same as that of the seventh embodiment mentioned above. However, according to the eighth embodiment, bolt retaining pawls 805o, 805p are formed on the body 805a to effect the following operation. That is, when the bolt 103 is inserted into the clip 805 and the yoke 101, the head portion 103a of the bolt 103 is brought into contact with the latching portions 805q, 805r of the bolt retaining pawls 805o, 805p, and then, stretches open the both latching portions 805q, 805r, as indicated by the arrows of double-dotted chain line in FIG. 20. Further, when the bolt 103 is inserted, the head portion 103a of the bolt 103 is disengaged from the tip ends of the latching portions 805q, 805r, whereby the bolt retaining pawls 805o, 805p are returned to their original forms, as indicated by the arrows of solid line. When the bolt 103 is completely inserted in this manner, the pressing resistance is rapidly decreased, and an assembling worker can confirm without fail the completion of the bolt inserting step. Also, the inserted bolt 103 is halted by the latching portions 805q, 805r of the bolt retaining pawls 805o, 805p, so as not to fall off or disengage unexpectedly.

Figure 22:
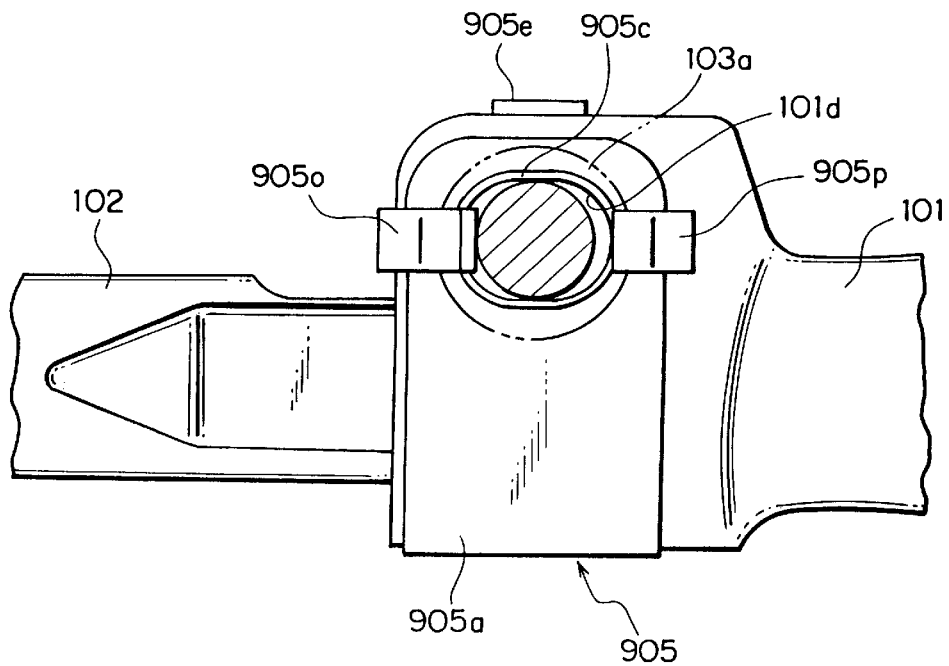
FIG. 22 is a side view for showing a universal joint using the yoke to which the clip of a temporary connection device for a universal joint according to the ninth embodiment is attached, in a state in which the universal joint is attached to a shaft.

FIG. 22 is a side view of a yoke with a clip according to the ninth embodiment attached thereto, in which the head portion of the bolt is indicated by a double-dotted chain line for the convenience of description. It should be noted that the configuration of the ninth embodiment is arranged by partly varying the configuration of the eight embodiment which is shown in FIGS. 18 to 21, and detailed description will be omitted for common components.

The ninth embodiment is different from the eighth embodiment in that one of the paired bolt bores 101d of the yoke 101 and that 905c of the clip 905 are laterally elongated, whereby the contact area between the head portion 103a of the bolt 103 and the seat surface becomes large. As a result, it is possible to prevent the bolt 103 from being loosened, so as to obtain a stable shaft :-retaining performance.

Figure 23:
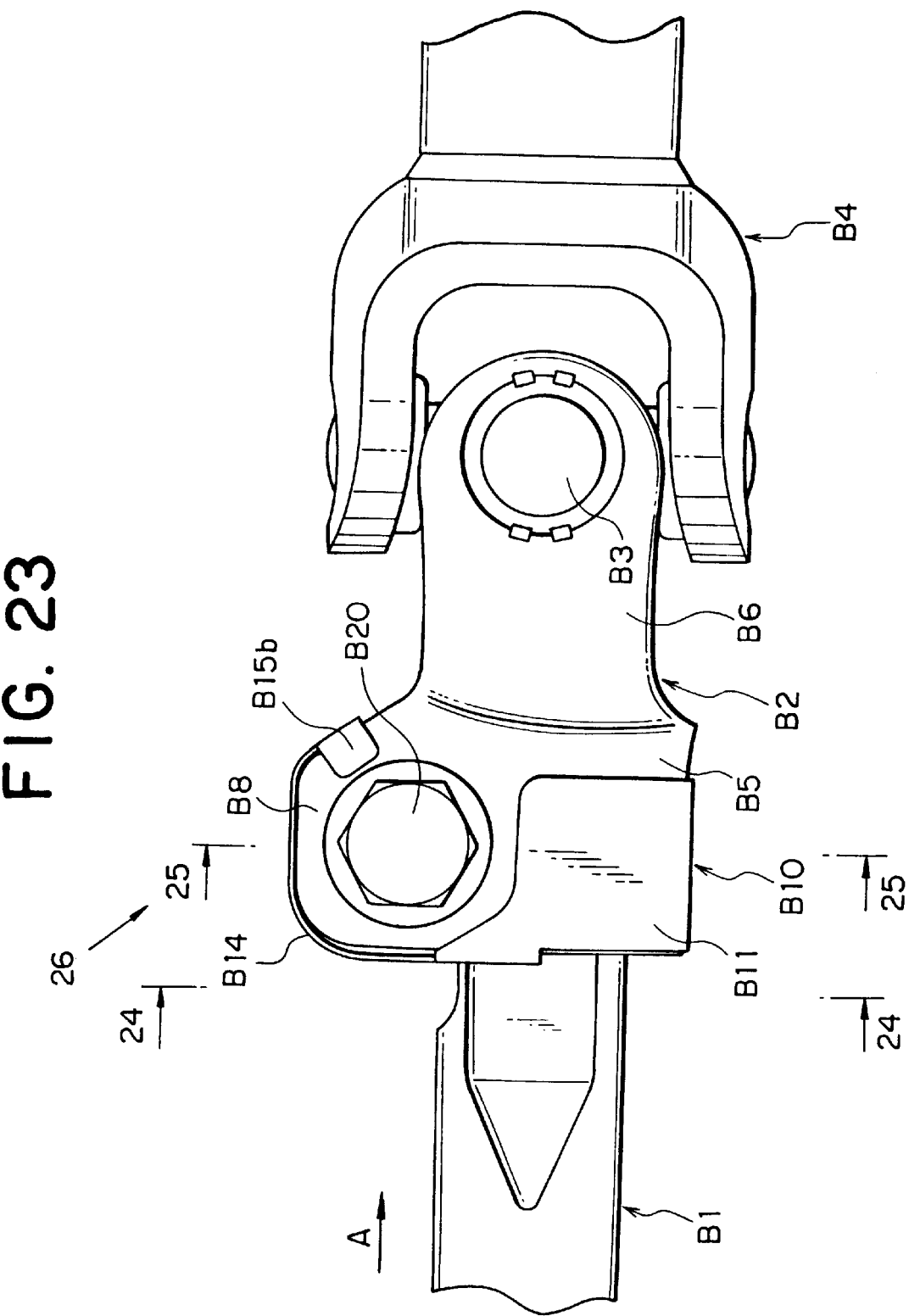
FIG. 23 is a front view of a universal joint according to the tenth embodiment of the present invention.
Figure 24:
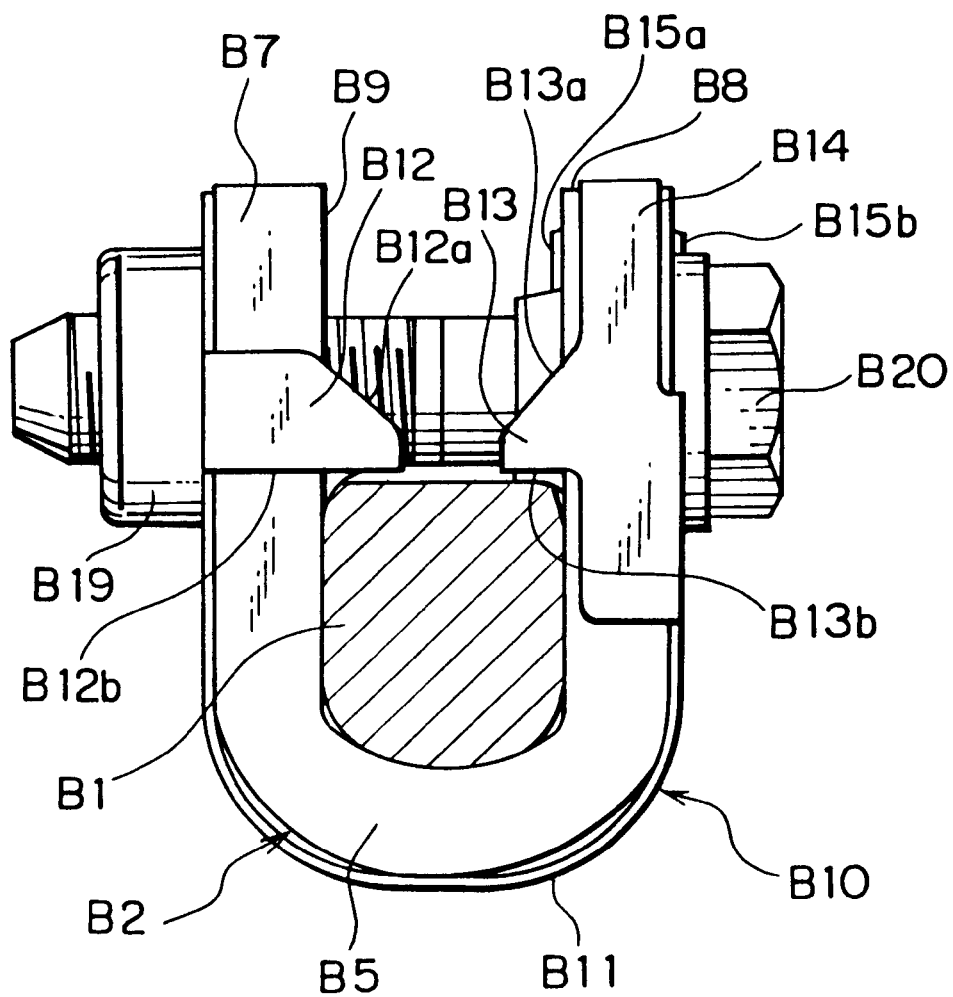
FIG. 24 is a cross-sectional view taken along the line 24—24 in FIG. 23 seen from the direction of the arrow.
Figure 25:
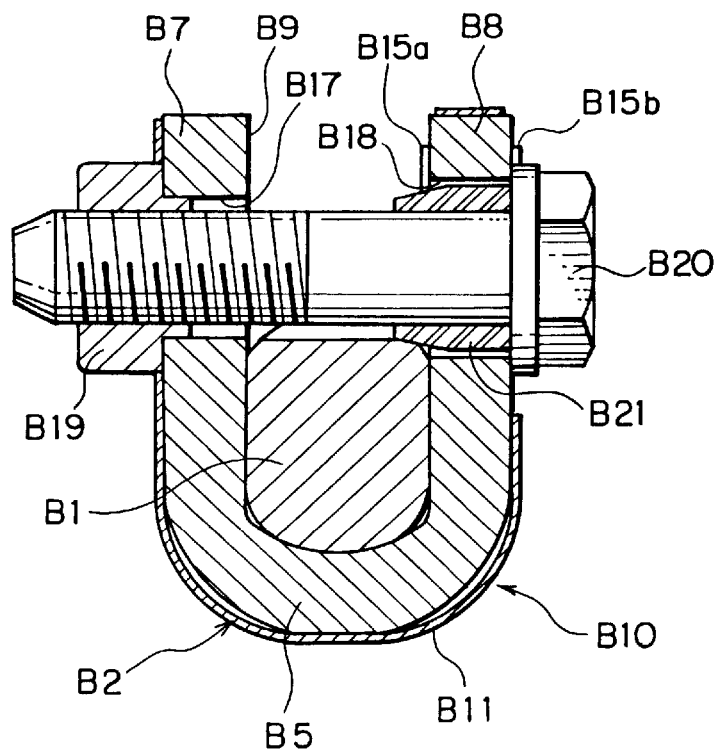
FIG. 25 is a cross-sectional view taken along the line 25—25 in FIG. 23 seen from the direction of the arrow.
Figure 26:
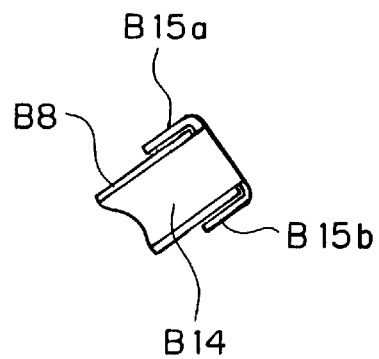
FIG. 26 is a view seen from the arrow 26 of FIG. 23.
Figure 27:
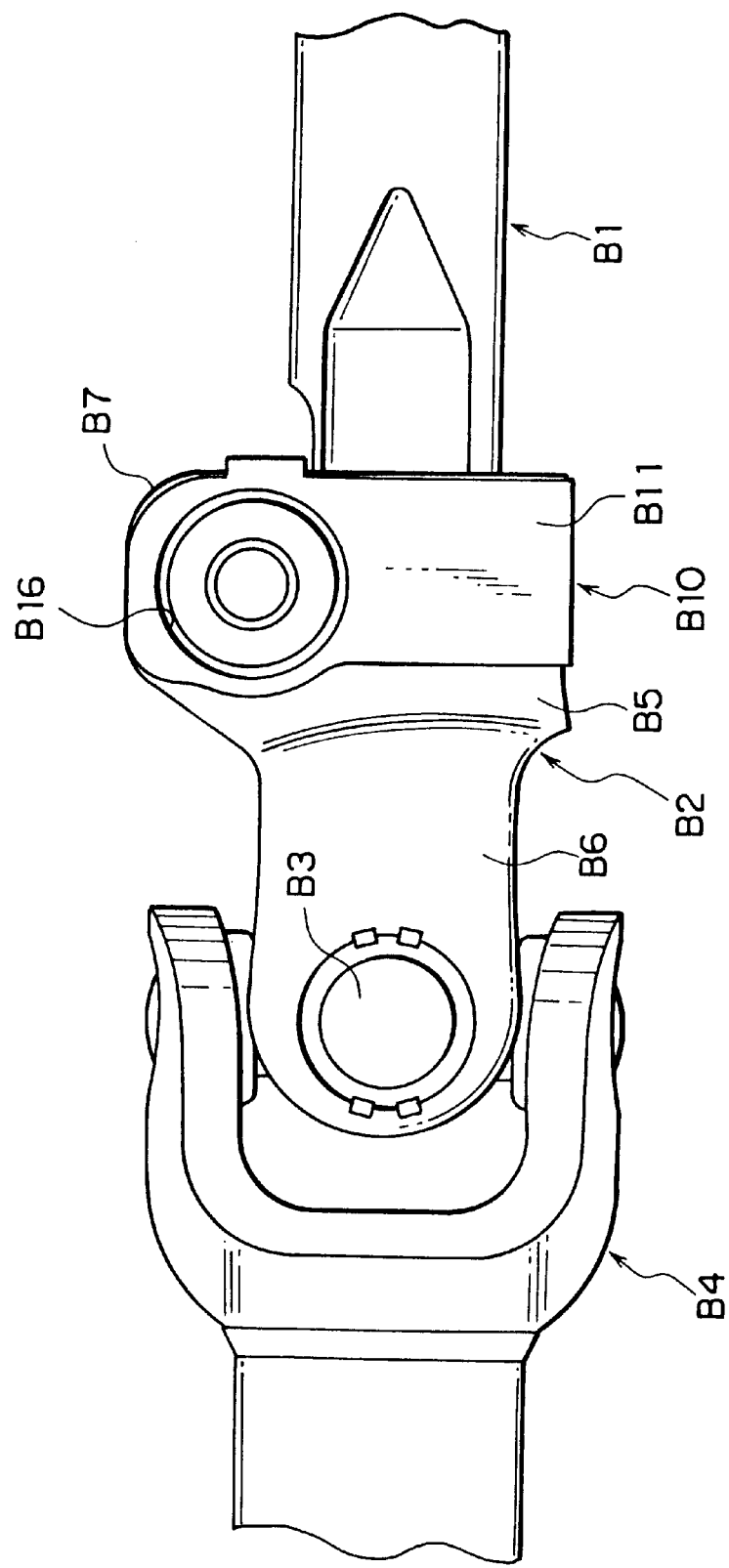
FIG. 27 is a view seen from the arrow 27 of FIG. 24.

FIG. 23 is a front view of a temporary connection device for a universal joint according to the tenth embodiment of the present invention. FIG. 24 is a cross-sectional view taken along the line 24—24 in FIG. 23. FIG. 25 is a cross-sectional view taken along the line 25—25 in FIG. 23. FIG. 26 is a view seen from the arrow 26 in FIG. 23. FIG. 27 is a view seen from the arrow 27 in FIG. 24.

In the tenth embodiment, as shown in FIG. 23, a steering shaft B1 in a steering apparatus of a motor vehicle is fitted in a yoke B2, and this yoke B2 is connected to another yoke B4 through a cross shaft B3. The yoke B2 is composed of a fit portion B5 in which the shaft B1 is fitted, and an arm portion B6 to be connected to the cross shaft B3. These parts are formed in one piece by press-working.

This fit portion B5 is provided with a U-shaped groove having a U-shaped cross section which is corresponding to the shape of the shaft B1 by use of a pair of tabs B7, B8, as shown in FIGS. 24 and 25. Further, the shaft B1 is normally in a stationary state, and the fit portion B5 is moved and rotated from the lower part, so that the shaft B1 is inserted into the U-shaped groove B9 of the fit portion B5.

A clip B10 is attached to this fit portion B5 in advance. This clip B10 has the main body B11 having a U-shaped cross section which is engaged with the lower side of the fit portion B5. A pair of protruding pieces which are capable of elastic deformation are extended toward the U-shaped groove B9 through the thicker-part surface of the pair of tabs B7, B8 from this main body B11. These protruding pieces B12, B13 are respectively provided with slant cam surfaces B12a, B13a on the upper sides thereof, as well as flat planes B12b, B13b formed parallel to each other on the flat upper surface of the shaft B1 on the lower side thereof. Thus, when the shaft B1 is inserted into the U-shaped groove B9, the protruding pieces B12 and B13 cause the slant surfaces B12a, B13a to be engaged with the shaft B1 and retracted, and are returned to their original positions by the elasticity thereof after the shaft B1 is completely stored in the U-shaped groove B9. Thus, the shaft B1 is temporarily retained in the U-shaped groove B9 by use of the flat surfaces B12b, B13b on the lower side so as to prevent the shaft B1 from falling off or disengaging. It should be noted that the U shape of the main body B11 of the clip B10 has an angle of 1 degree to 15 degrees in total in a direction which becomes an interference, with respect to the U shape on the outer surface of the yoke B2, whereby the clip B10 can be retained without backlash with respect to the yoke B2.

Further, a band portion B14 is extended upward along the thicker-part surface of one of the tabs B8. This band portion B14 is extended to go over the apex of the tab B8 up to a portion inclined downward. A pair of sandwich pieces B15a, B15b are provided for sandwiching the thicker-part surface of the tab B8 therebetween at the tip ends of this band portion B14. The clip B10 is supported in the fit portion B5 of the yoke B2 by these sandwich pieces B15a, B15b.

Further, as shown in FIG. 27, the main body B11 of the clip B10 is extended to go above the tab B7, on the tab B7 side. This main body B11 is provided with an escape bore B16 for avoiding an interference with a nut B19 as to be described later.

When the clip B10 thus arranged is attached to the fit portion B5 of the yoke B2, the clip B10 is inserted into the yoke B2 from the direction indicated by the arrow in FIG. 23 until the escape bore B16 of the clip BIO reaches the position of the nut B19. The band portion B14 of the clip B10 is wound up from the apex of the tab B8 to the portion inclined downward, so that the thicker-part surface of the tab B8 is sandwiched by and between the pair of sandwich pieces B15a, B15b. As described, the clip B10 is comprised of the main body B131, the pair of protruding pieces B12, B13, the band portion 1314, the pair of sandwich pieces B15a, B15b, and the escape bore B16, so that the clip B10 is securely attached to the fit portion B15 of the yoke B2.

Further, a pair of bolt bores B17₁, B18 are formed on the pair of tabs B7, B8, respectively. The nut B19 is press fitted and secured to one of the bolt bores B17 in advance. A bolt B20 which has a tapered collar B21 made of resin is inserted into the other bolt bore B18 and is fastened up by the nut B19 as to be described later. The shaft B1 is centered by the tapered collar B21.

It should be noted that in the portion inclined downward from the apex of the tab B8, which Is sandwiched by and between the pair of sandwich pieces B15a, B15b, the yoke B2 is formed by press-working, so that the yoke B2 does not take an exact U shape corresponding to the outer form of the shaft B1, but spreads out. As a result, when the shaft B1 is inserted into the U-shaped groove B9, the shaft B1 does not interfere with the pair of sandwich pieces B15a, B15b and can be easily inserted. Also, the U-shaped groove B9 of the yoke B1 is opened upward by, for example, about 2 degrees, which also facilitates the insertion of the shaft B1 into the U-shaped groove B9.

Next, description will be made on the step of connecting a steering shaft of the tenth embodiment to the yoke of a universal joint.

As described above, since the yoke B2 to which the clip B10 is already attached is moved and rotated from below, the shaft B1 in a stationary state is inserted into the U-shaped groove B9 of the fit portion B5 of the yoke B2 to be fitted therein.

When this shaft B1 is inserted into the U-shaped groove B9, the protruding pieces B12, B13 cause the slant surfaces B12a, B13a thereof to be engaged with the shaft B1 and retreat. When the shaft B1 is completely stored in the U-shaped groove B9, the protruding pieces B12, B13 are returned to their original positions by the elasticity thereof, so as to temporarily retain the shaft B1 in the U-shaped groove B9 by use of the lower flat planes B12b, B13b and prevent the shaft B1 from falling off or removing.

Next, the bolt B20 having the tapered collar B21 is passed through the bolt bore B18 of the tab B8 and the bolt bore B17 of the tab B7, so as to be engaged with the nut B19 which has been press fitted and secured to the bolt bore B17 in advance, and fastened up. As the bolt B20 is fastened up, the tapered collar B21 is brought into contact with the shaft B1 and urges the shaft B1 toward the lower side of the U-shaped groove B9, whereby the centering of the shaft Bl for the U-shaped groove B9 is carried out.

As described above, according to the present embodiment, it is possible to temporarily retain the shaft 3B1 in the yoke B2 securely due to the elastic deformation of the pair of protruding pieces B12, B13 of the clip B10, thereby conspicuously enhancing the workability.

Also, the clip B10 is attached to the tab B8 of the yoke B2 with the pair of sandwich pieces B15a, B15b, so that there is no possibility for the clip B10 of falling off or disengaging unexpectedly.

Further, with these paired sandwich pieces B15a, B15b, it is not required to fasten up the clip B10 together with the bolt and the nut, so that after the fastening by use of the bolt and the nut is carried out, this fastening becomes stable and can render satisfactory fastening force.

Further, since the clip B10 is attached to the yoke B2 by use of the pair of sandwich pieces B15a, B15b, the clip B10 can be easily removed and reused even after fastened by the bolt and the nut. Also, the present embodiment can be applied to a case in which the yoke B2 is short.

Further, it is not required to employ a nut, etc., of a special form, so as to conspicuously enhance the workability. Thus, the manufacturing cost can be reduced.

Figure 28:
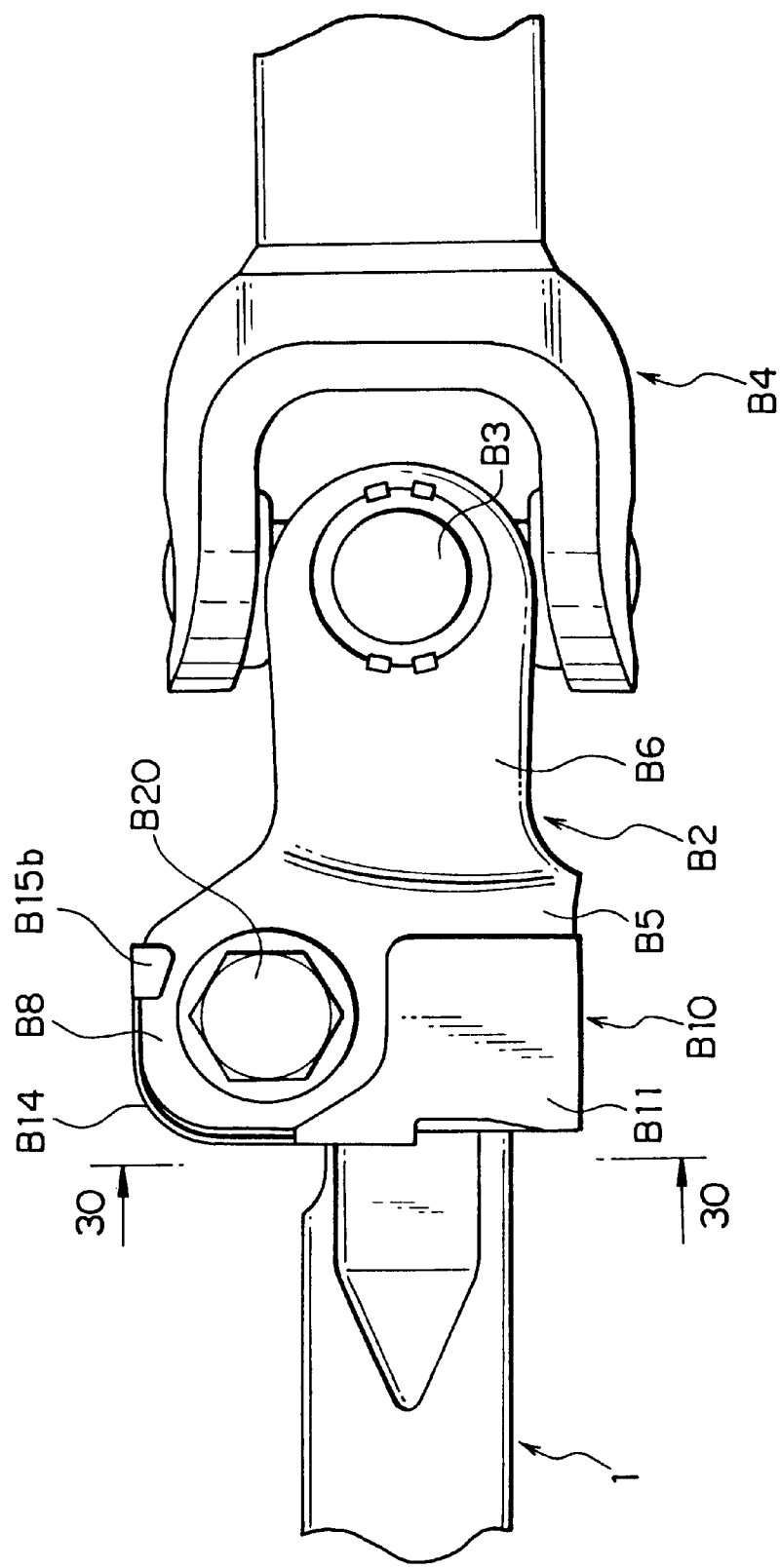
FIG. 28 is a front view of a universal joint according to the eleventh embodiment of the present invention.
Figure 29:
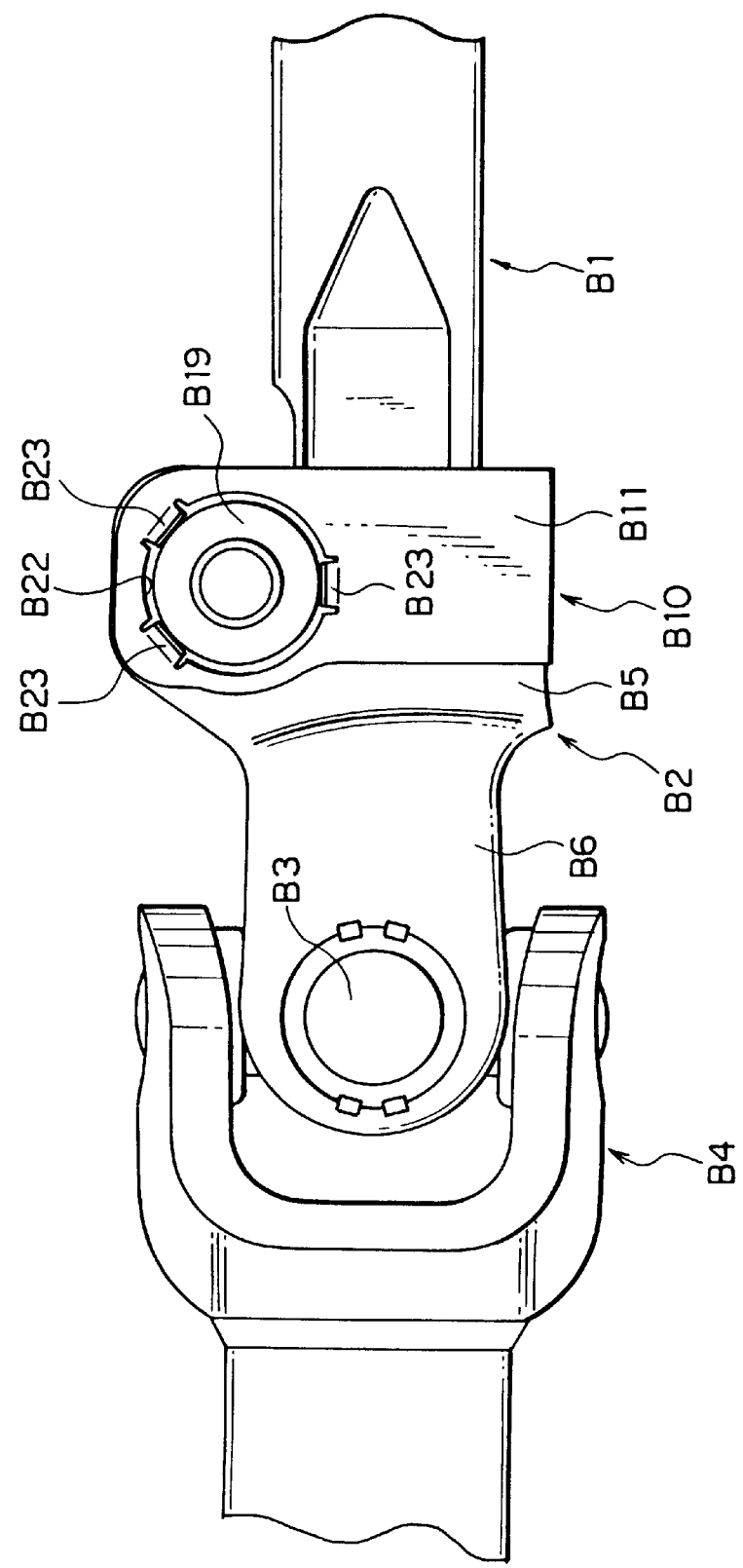
FIG. 29 is a back view of the universal joint shown in FIG. 28.
Figure 30:
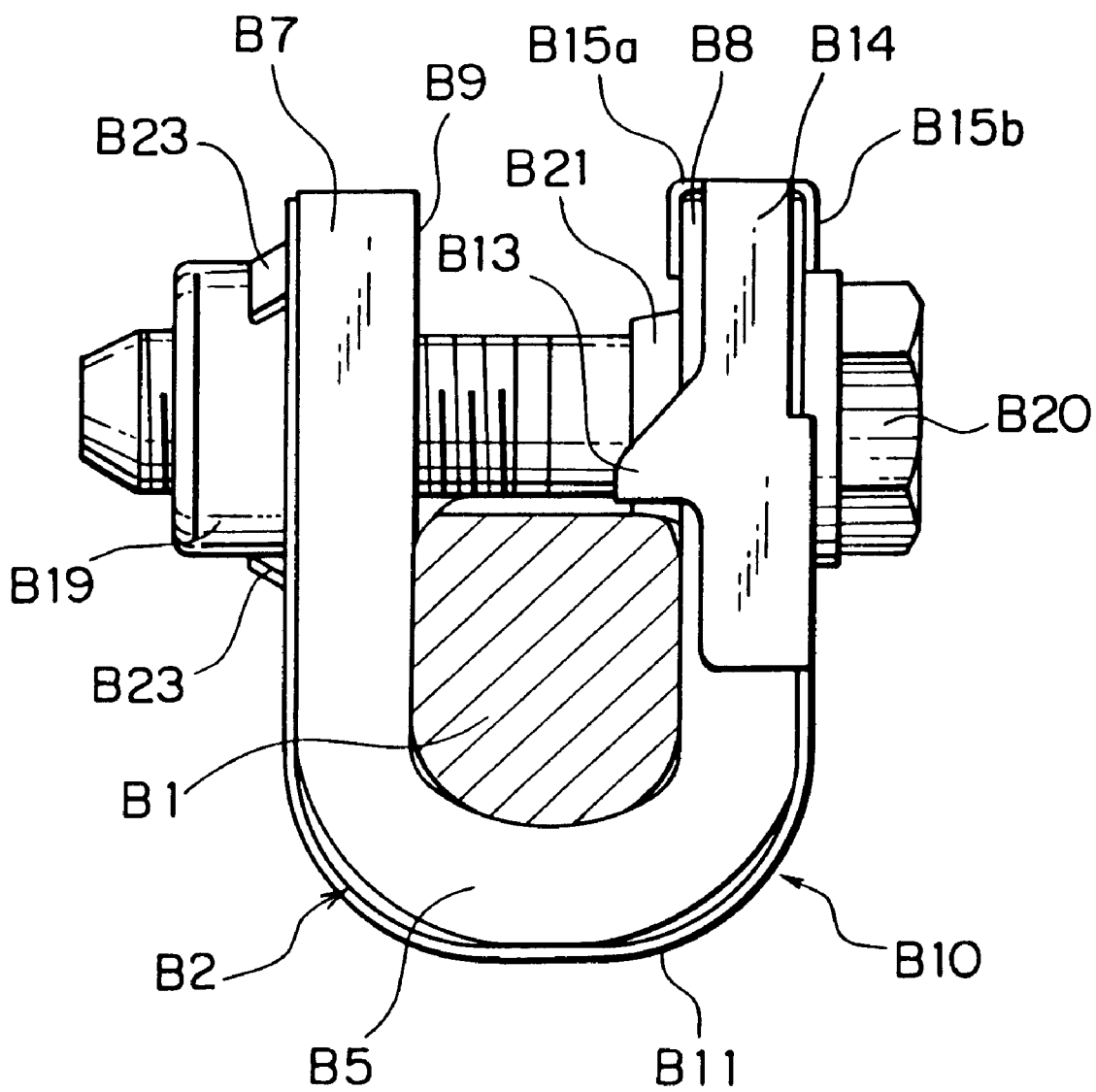
FIG. 30 is a cross-sectional view taken along the line 30—30 in FIG. 28.

Next, a connection device for a universal joint according to the eleventh embodiment of the present invention will be described with reference to FIGS. 28 to 30. FIG. 28 is a front view of a universal joint according to the eleventh embodiment of the present invention. FIG. 29 is a back view of the universal joint shown in FIG. 28. FIG. 30 is a cross-sectional view taken along the line 30—30 in FIG. 28. It should be noted that the identical components to those in the tenth embodiment are given the same referential numerals, and description thereof will be omitted.

According to the eleventh embodiment, as shown in FIG. 28, the band portion B14 is not extended from the apex of the tab B8 to the portion inclined downward, but halted at the apex of the tab B8, and the pair of sandwich pieces B15a, B15b sandwich this apex of the tab B8 therebetween. For this reason, the clip B10 can be manufactured easily, compared with the tenth embodiment.

Also, according to the tenth embodiment, the escape bore B16 of the clip B10 is formed around the nut B19. However, according to the eleventh embodiment, as shown in FIG. 29, three protrusions B23 are formed on the circumference of the bore B22 of the clip B10 formed around the nut B19. Accordingly, when the clip B10 is attached to the yoke B2, these three protrusions B23 are raised to be engaged with the circumference of the nut B19, whereby the clip B10 can be retained on the yoke B2 securely.

Further, according to the tenth embodiment, there are provided one pair of protruding pieces B12, B13 in order to temporarily retain the shaft B1. However, according to the eleventh embodiment, as shown in FIG. 30, there is not provided the protruding piece B12 on the tab B7 side, but only the protruding piece B13 is provided on the tab B8 side, whereby the shaft B1 is temporarily retained by this protruding piece B13.

Figure 31:
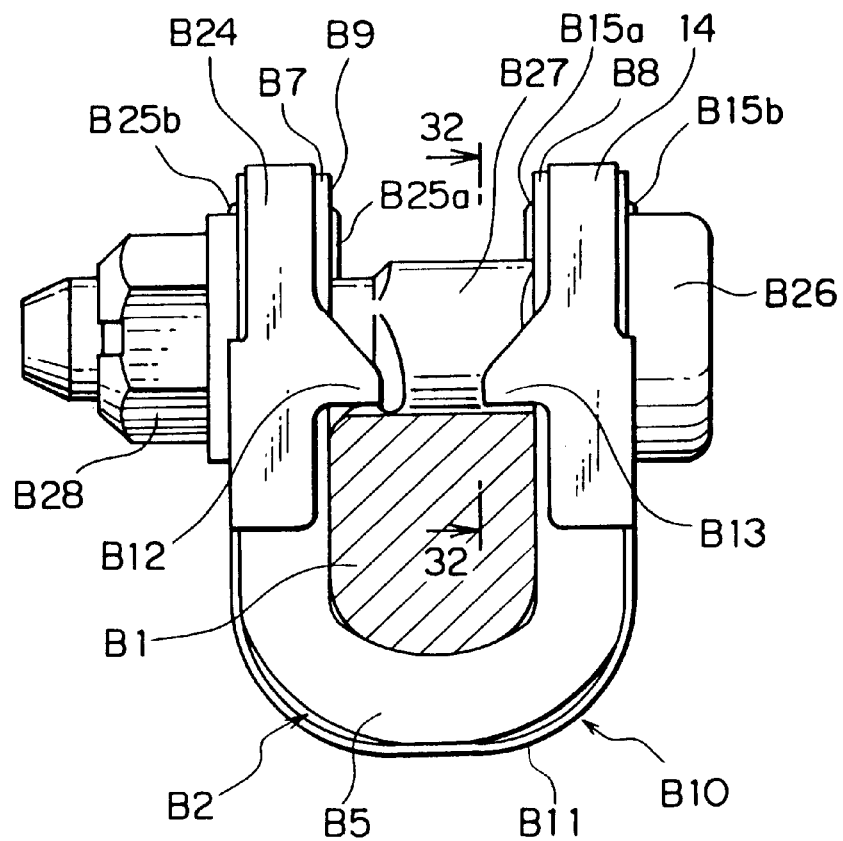
FIG. 31 is a cross-sectional view of a universal joint according to the twelfth embodiment of the present invention.
Figure 32:
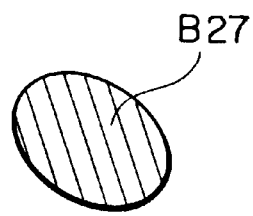
FIG. 32 is a cross-sectional view taken along the line 32—32 in FIG. 31.
Figure 33:
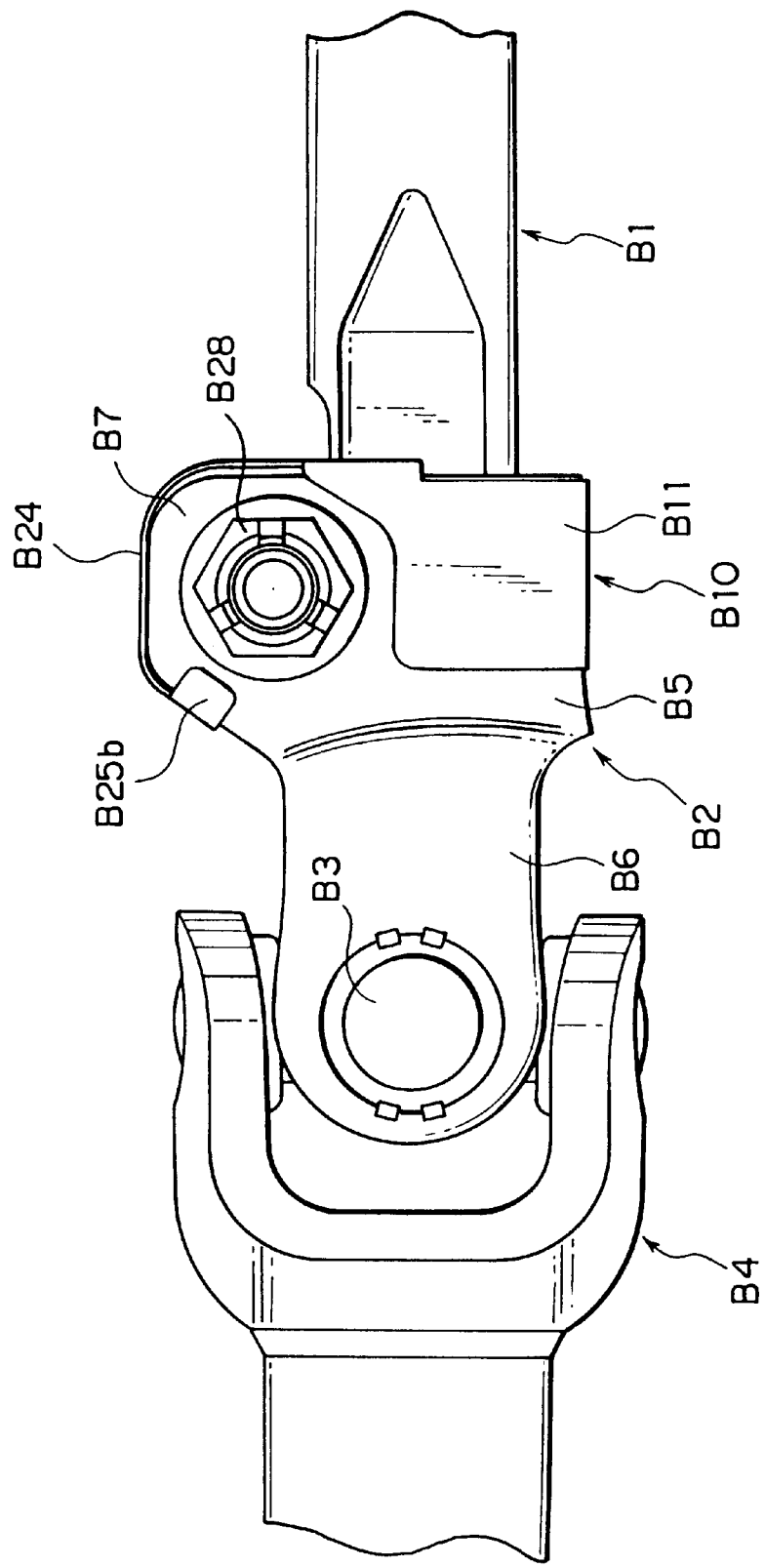
FIG. 33 is a view seen from the arrow 33 of FIG. 31.

Next, a connection device for a universal joint according to the twelfth embodiment of the present invention will be described with reference to FIGS. 31 to 33. FIG. 31 is a cross-sectional view of a universal joint according to the twelfth embodiment of the present invention. FIG. 32 is a cross-sectional view taken along the line 32—32 in FIG. 31. FIG. 33 is a view seen from the left side in FIG. 31. It should be noted that the identical components to those in the tenth embodiment are given the same referential numerals in this embodiment, and description thereof will be omitted.

According to the twelfth embodiment, the band portion B24 is extended from the apex of the tab B7 to the portion inclined downward, also on the tab B7 side. A pair of sandwich pieces B25a, B25b for sandwiching the tab B7 therebetween are provided at the tip end of this band portion B24. Accordingly, the clip B10 is securely retained on the yoke B2 not only by the pair of sandwich pieces B15a, B15b on the tab B8 side, but also by the pair of sandwich pieces B25a, B25b on the tab B7 side.

A cam bolt B26 having a cam portion B27 and a caulking nut B28 are also employed. The cam portion B27 takes an oval shape, as shown in FIG. 32. With this cam portion B27, when the fastening operation is conducted by a bolt and a nut, if the caulking nut B28 is fastened up to some extent, the caulking nut B28 and the cam bolt B26 are started to rotate together, and the cam portion B27 is brought into contact with the shaft B1 to urge the shaft B1 toward the lower part of the U-shaped groove B9, whereby the shaft B1 is centered with respect to the U-shaped groove B9.

Figure 34:
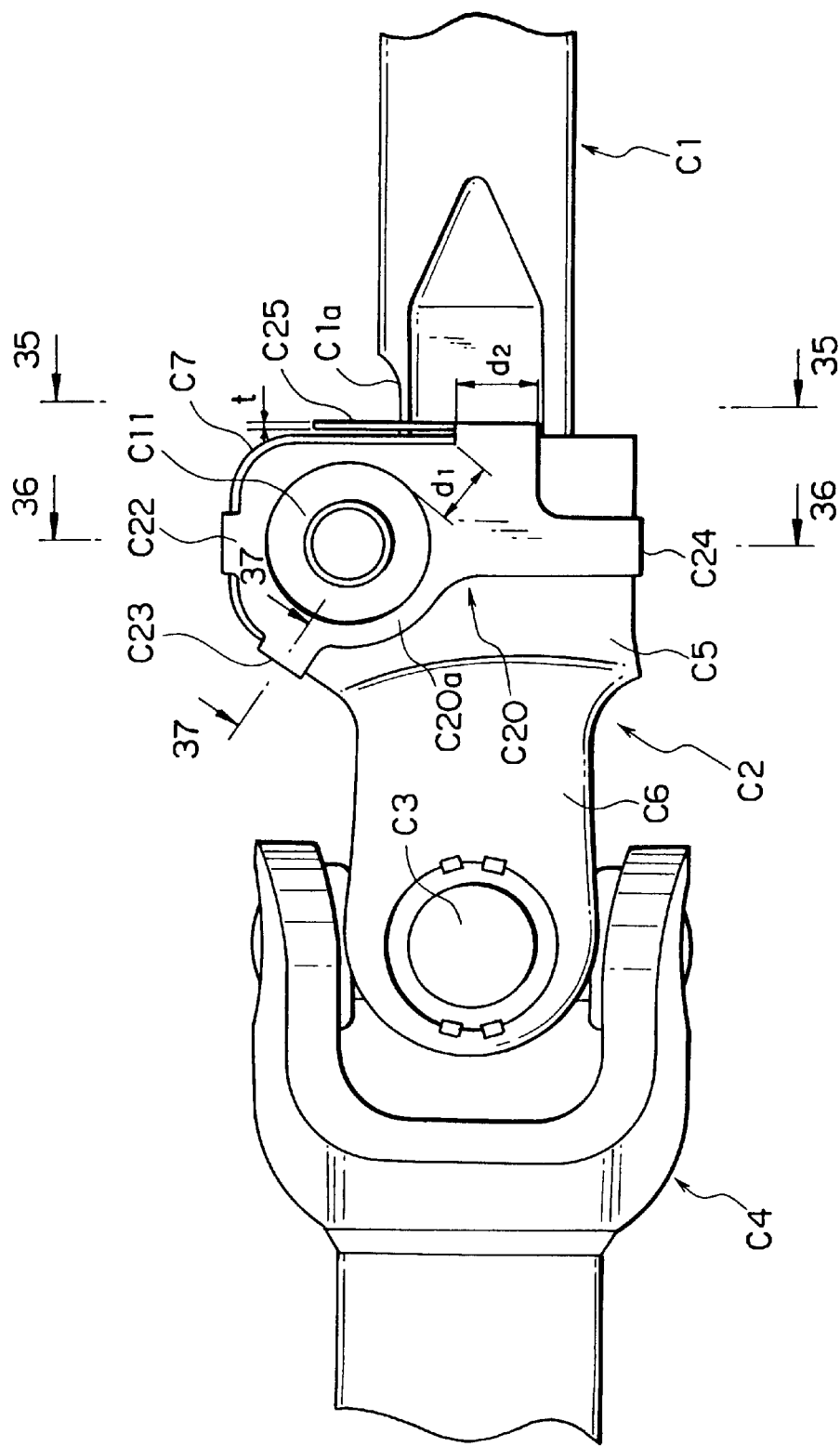
FIG. 34 is a front view of a universal joint according to the thirteenth embodiment of the present invention.
Figure 35:
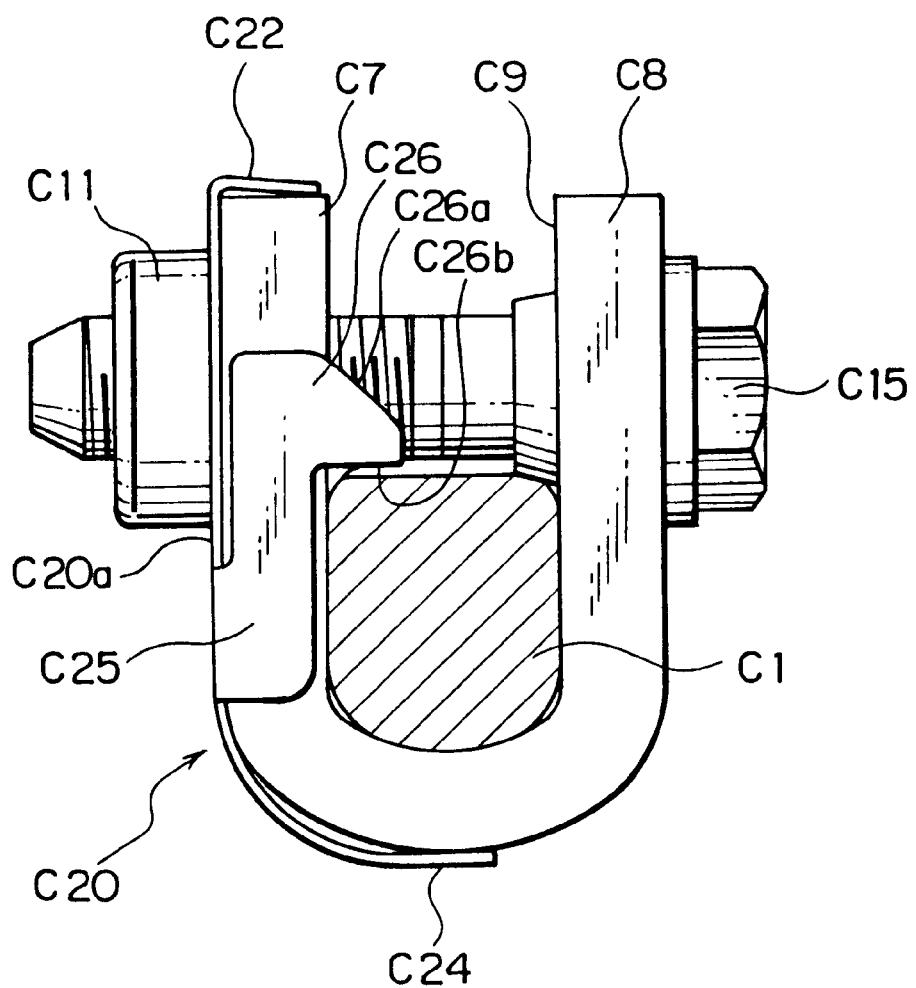
FIG. 35 is a cross-sectional view taken along the line 35—35 in FIG. 34.
Figure 36:
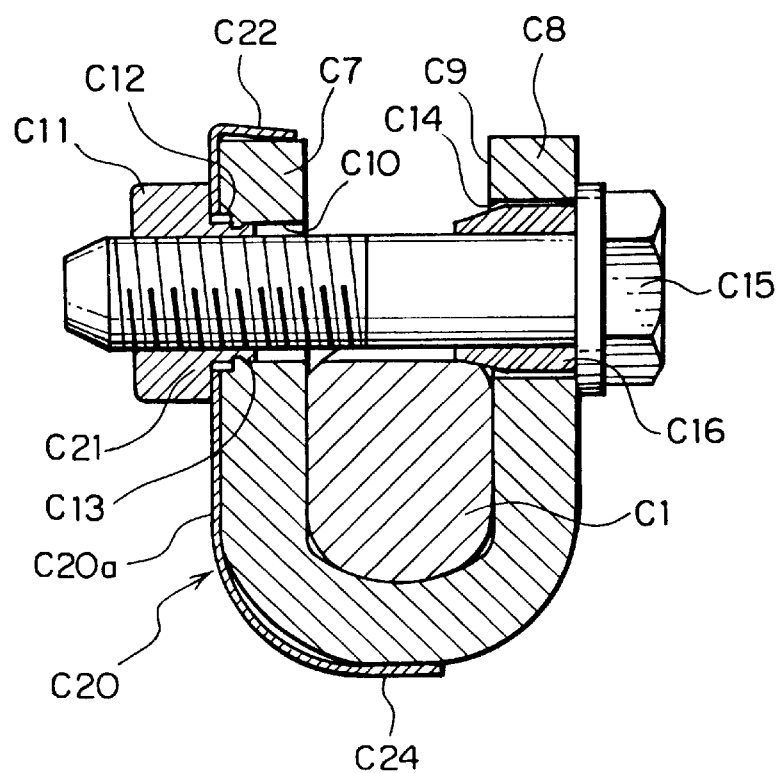
FIG. 36 is a cross-sectional view taken along the line 36—36 in FIG. 34.
Figure 37:
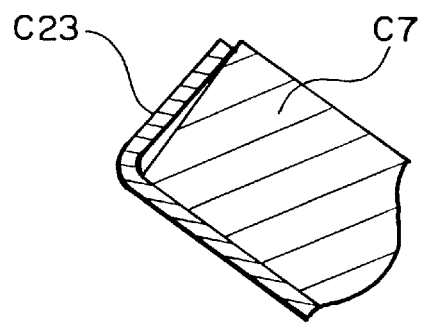
FIG. 37 is a cross-sectional view taken along the line 37—37 in FIG. 34.

FIG. 34 is a front view of a connection device for a universal joint according to the thirteenth embodiment of the present invention. FIG. 35 is a cross-sectional view taken along the line 35—35 in FIG. 34. FIG. 36 is a cross-sectional view taken along the line 36—36 in FIG. 34. FIG. 37 is a cross-sectional view taken along the line 37—37 in FIG. 34.

According to the thirteenth embodiment, as shown in FIG. 34, a steering shaft C1 in a steering apparatus of a motor vehicle has a substantially oval or egg-shaped cross section with a notch C1a and is fitted in a yoke C2, and this yoke C2 is connected to another yoke C4 through a cross shaft C3. The yoke C2 is composed of a fit portion C5 in which the shaft C1 is fitted, and an arm portion C6 to be connected to the cross shaft C3. These parts are formed in one piece by press-working.

This fit portion C5 is provided with a U-shaped groove C9 having a U-shaped cross section which is corresponding to the shape of the shaft C1 with a pair of tabs C7, C8, as shown in FIGS. 35 and 36. Further, the shaft C1 is moved and rotated from above and is inserted into the U-shaped groove C9 to be fitted.

One of the tabs C7 is provided with a nut bore C10, as shown in FIG. 36, and a nut C11 is press fitted and secured to this nut bore C10. The nut C11 has a knurling C12 which has the diameter slightly larger than the nut bore C10, and a small-diameter portion having the diameter slightly smaller than the nut bore C0 and a tapered groove having the diameter which becomes larger toward the knurling at the tip end thereof. When the nut Cli is press fitted into the nut bore C10, the inner peripheral surface of the nut bore C10 is cut into the tapered groove, thereby the nut C11 being fixed.

A bolt bore C14 is formed on one of the tabs C8, and a bolt C15 having a tapered collar C16 made of resin is inserted into this bolt bore C14. Then, as to be described later, the bolt C15 is fastened by the nut C11 and the shaft C1 is centered by the tapered collar C16.

A clip C20 which is formed of an elastically deformable thin plate is attached to the outer wall surface of the tab C7 in advance. The main body C20a of this clip C20 has an installing bore C21 which is larger than the outer diameter of the knurling C12 of the nut C11. Further, the clip main body C20a is provided with a bent leg portion C22 at the upper part thereof, a bent leg portion C23 at an diagonally upper part thereof, and a bent leg portion C24 at the lower part thereof, respectively. Accordingly, when the clip main body C20a is attached to the outer wall surface of the tab C7, these leg portions C22, C23, C24 are respectively engaged with the clip main body C20a so that the clip main body C20a is positioned on the outer wall surface of the tab C7. Then, when the nut C11 is inserted into the nut bore C10 through the installing bore C21 of the clip main body C20a and the knurling tool C12 is urged into the nut bore C10 while the nut Cll is urged into the nut bore C10 to be fixed in such a manner that the inner peripheral surface of the nut bore CIO is cut into the tapered groove C13, the clip main body C20a is fixed on the outer wall surface of the tab C7.

Further, as shown in FIG. 35, the clip main body C20a is provided with an elastically deformable bent piece C25 which is bent on the thicker-part surface of the tab C7 and is extended in parallel to the thicker-part surface. A protruding piece C26 having a triangular shape is formed at the upper end of this bent piece C25. This protruding piece C26 is provided with a slant cam surface C26a on the upper side thereof, and a flat surface C26b which is formed in parallel to the flat upper surface of the shaft C1 on the lower side thereof. Thus, when the shaft Cl is inserted into the U-shaped groove C9, the protruding piece C26 causes the slant surface C26a thereof to be engaged with the shaft C1 and is retracted. After the shaft C1 is completely stored in the U-shaped groove C9, the protruding piece C26 is returned to its original position by the elasticity thereof, temporarily retains the shaft C1 in the U-shaped groove C9 with the lower flat surface C26b, and prevents the shaft C1 from falling off or disengaging.

Specially, according to the present embodiment, as shown in FIG. 34, a distance dl between the peripheral edge of the installing bore C2 of the clip main body C20a and the starting point of a curve R of the bent portion of the bent piece C25 is set to be comparatively large, so that when the shaft C1 is inserted into the U-shaped groove C9, the bent piece C25 and the protruding piece C26 can be bent by a small load, and the shaft C1 is allowed to pass with a small load. This distance d1 is preferably 5 mm or more. More specifically, when the clip main body C20 is made of hardened steel plate having the thickness t of 0.5 mm (the rigidity is about HRC40), and the distance d1 is 6 mm, and the width d2 of the bent portion of the bent piece C25 is 7.5 mm, an inserting power of the shaft C1 is about 15 to 80 N.

Next, the step of connecting the steering shaft to the yoke of the universal joint will be described.

First, the clip main body C20a is attached to the outer wall surface of the tab C7 in advance. Leg portions C22, C23, C24 of the clip main body C20a and the protruding piece C26 are respectively engaged with the tab C7, so that the clip main body C20a is positioned on the outer wall surface of the tab C7. Next, the nut C11 is inserted into the nut bore C10 through the installing bore C21 of the clip main body C20a, and the nut C11 is urged into the nut bore CIO in such a manner that the inner peripheral surface of the nut bore C10 is cut into the tapered groove C13, whereby the clip main body C20a is fixed on the outer wall surface of the tab C7.

Subsequently, as shown in FIG. 34, the shaft C1 is moved and rotated from diagonally above so as to be inserted into the U-shaped groove of the yoke C2 to which the clip C10 is attached In advance.

When this shaft C1 is to be inserted into the U-shaped groove C9, the protruding piece C26 causes the slant surface C26a to be engaged with the shaft C1 and is retracted. After the shaft C1 is completely stored in the U-shaped groove C9, the protruding piece C26 is returned to its original position by the elasticity thereof, temporarily retains the shaft C1 in the U-shaped groove C9 with the lower flat plane C26b, and prevents the shaft C1 from falling off or disengaging.

Next, the bolt C15 having the tapered collar C16 is passed through the bolt bore C14 of the tab C8, so as to be engaged with the nut C11 which is urged into the nut bore C14 in advance, and fastened up. As the bolt C15 is fastened up, the tapered collar C16 is brought into contact with the shaft C1 to urge the shaft C1 toward the lower part of the U-shaped groove C9, whereby the shaft C1 is centered with respect to the U-shaped groove C9.

As described above, according to the present embodiment, the clip C20 is fixed to the outer wall surface of the tab C7 with the nut C11 which is urged into the nut bore C10. As a result, there is no chance for the clip of falling off or disengaging unexpectedly.

In addition, the shaft C1 can be temporarily retained on the yoke C2 securely due to the elastic deformation of the protruding piece C26 of the clip C20, whereby the workability can be conspicuously enhanced.

Further, since it is not required to employ a nut or the like of a special form, the manufacturing cost can be reduced. Further, since a working space for connecting the shaft 1 is small, the invention can be applied even to a steering shaft of a motor vehicle having a small working space.

Figure 38:
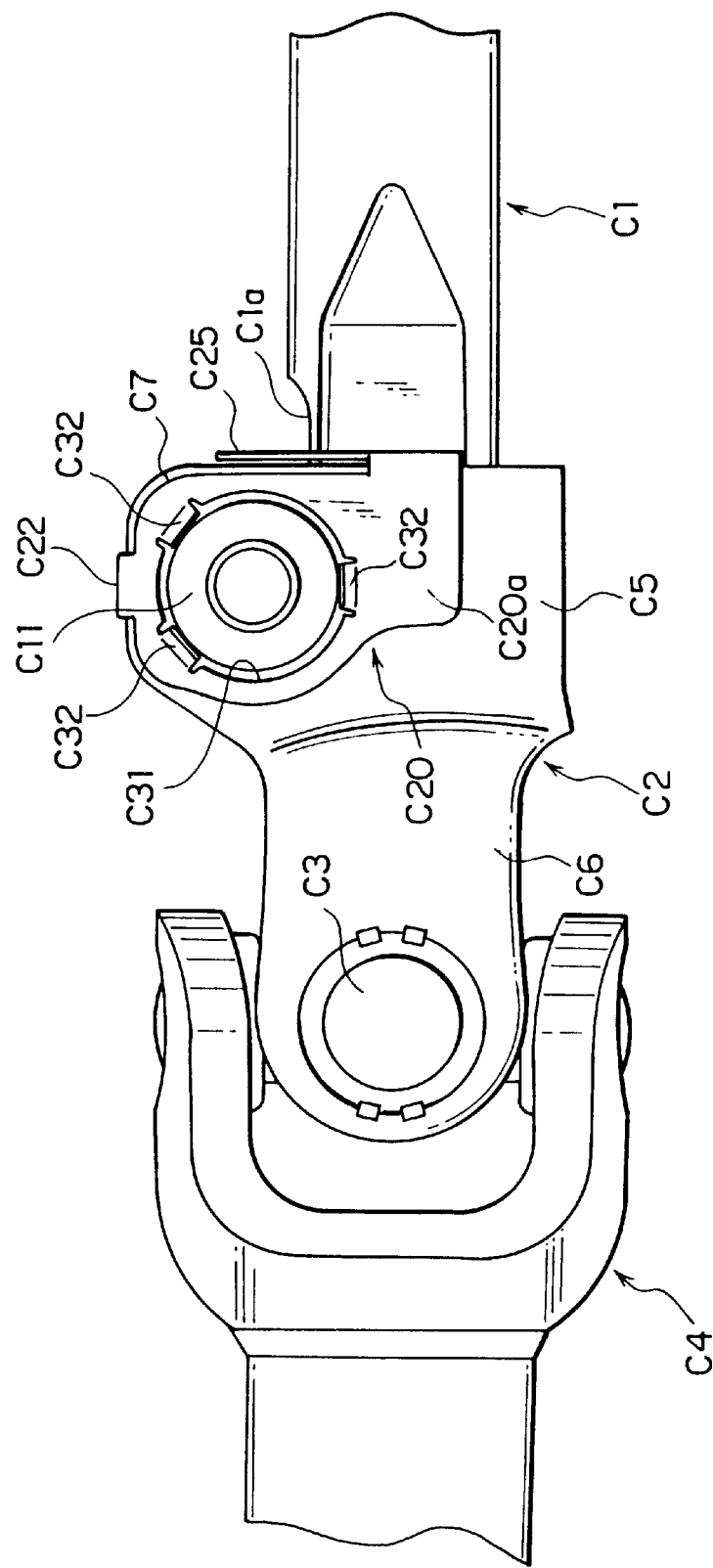
FIG. 38 is a front view of a universal joint according to the fourteenth embodiment of the present invention.

Next, a connection device for a universal joint according to the fourteenth embodiment of the present invention will be described with reference to FIG. 38. FIG. 38 is a front view of a connection device for a universal joint according to the fourteenth embodiment of the present invention.

According to the fourteenth embodiment, as shown in FIG. 38, the nut C11 is urged into the nut bore in the same manner as in the twelfth embodiment, and three projections C32 are formed on the circumference of the bore C31 of the clip main body C20a formed around the nut C11. Accordingly, when the clip main body C20a is attached to the outer wall surface of the tab C7, it is possible to securely fix the clip main body C20a to the outer wall surface of the tab C7, by causing these three projections C32 to be engaged with the circumference of the nut C11.

According to the present embodiment, it is necessary to prevent the rotation of the clip main body C20a when the shaft C1 is temporarily retained by the clip main body C20a, and to make the engaging force of the three projections C32 with the nut C11 to be comparatively large. For this reason, though the thickness of the clip main body C20a is set to be 0.5 mm in the twelfth embodiment, the thickness of the clip main body C20a is set to be 0.7 mm in the present embodiment.

It should be noted that in the present embodiment the leg portions C23, C24 of the thirteenth embodiment are not provided.

Figure 39:
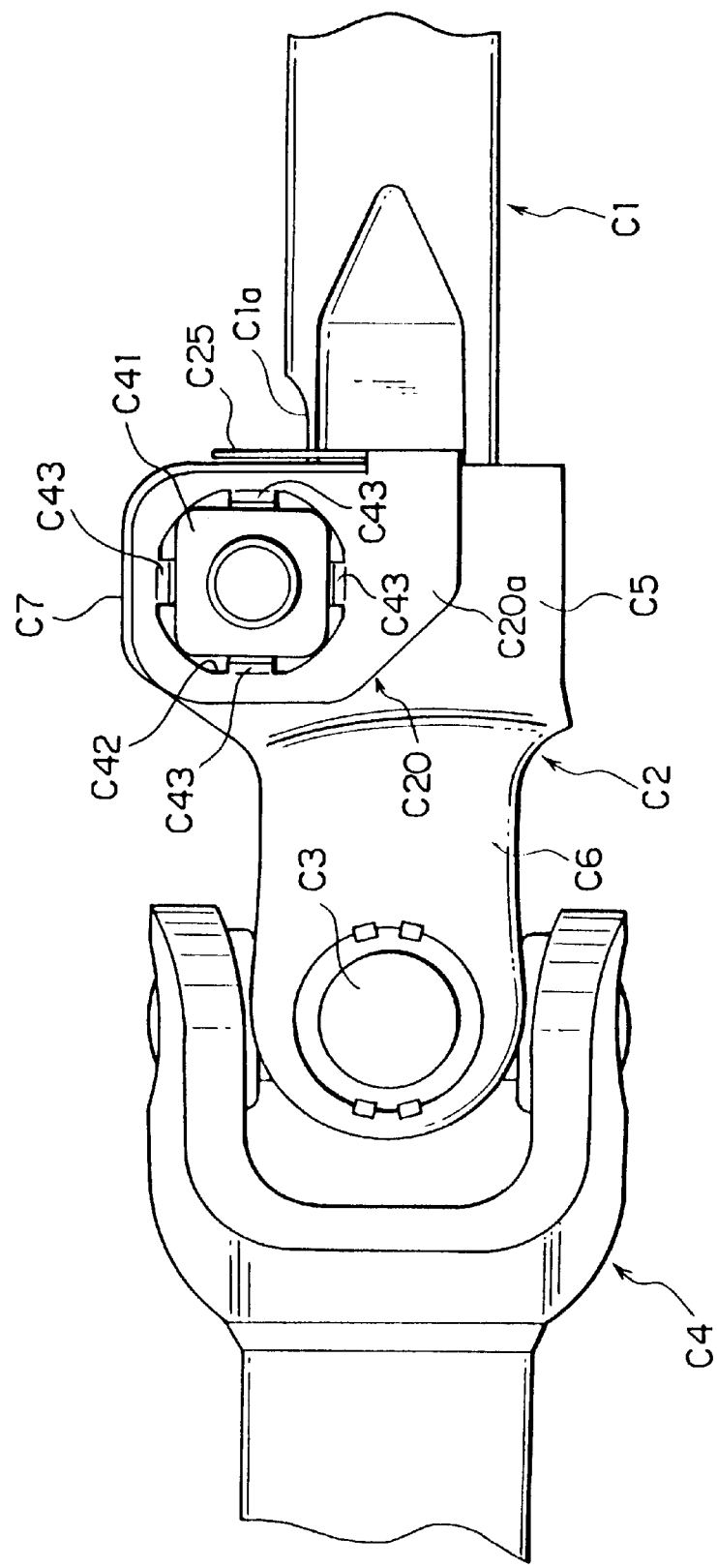
FIG. 39 is a front view of a universal joint according to the fifteenth embodiment of the present invention.
Figure 40:
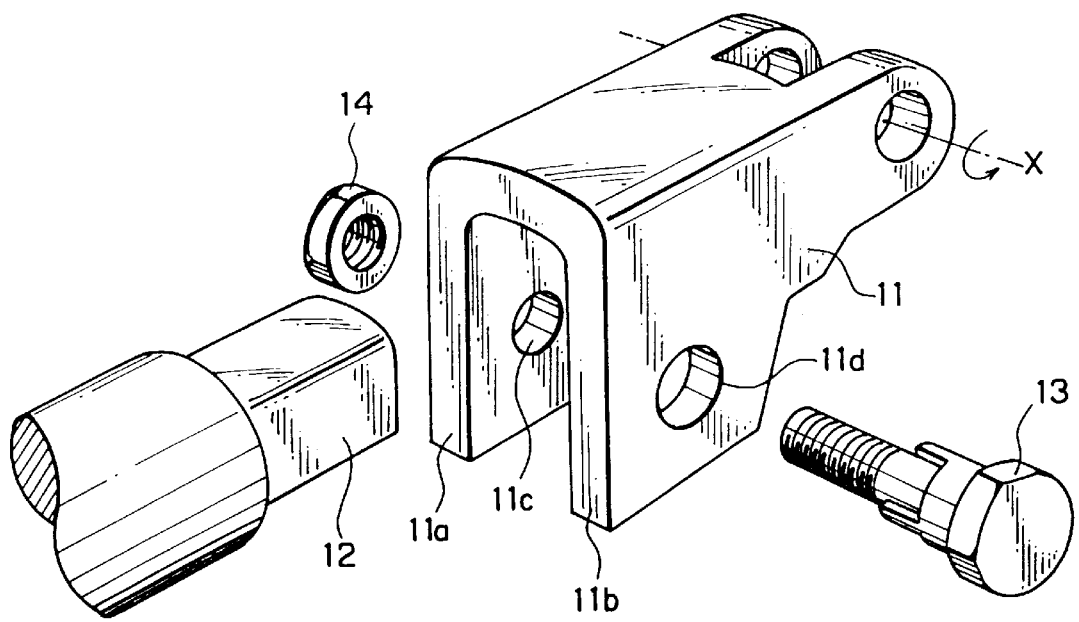
FIG. 40 is a view for showing an arrangement of connection between the yoke and the shaft according to the prior art disclosed in the U.S. Pat. No. 4,900,178.
Figure 41:
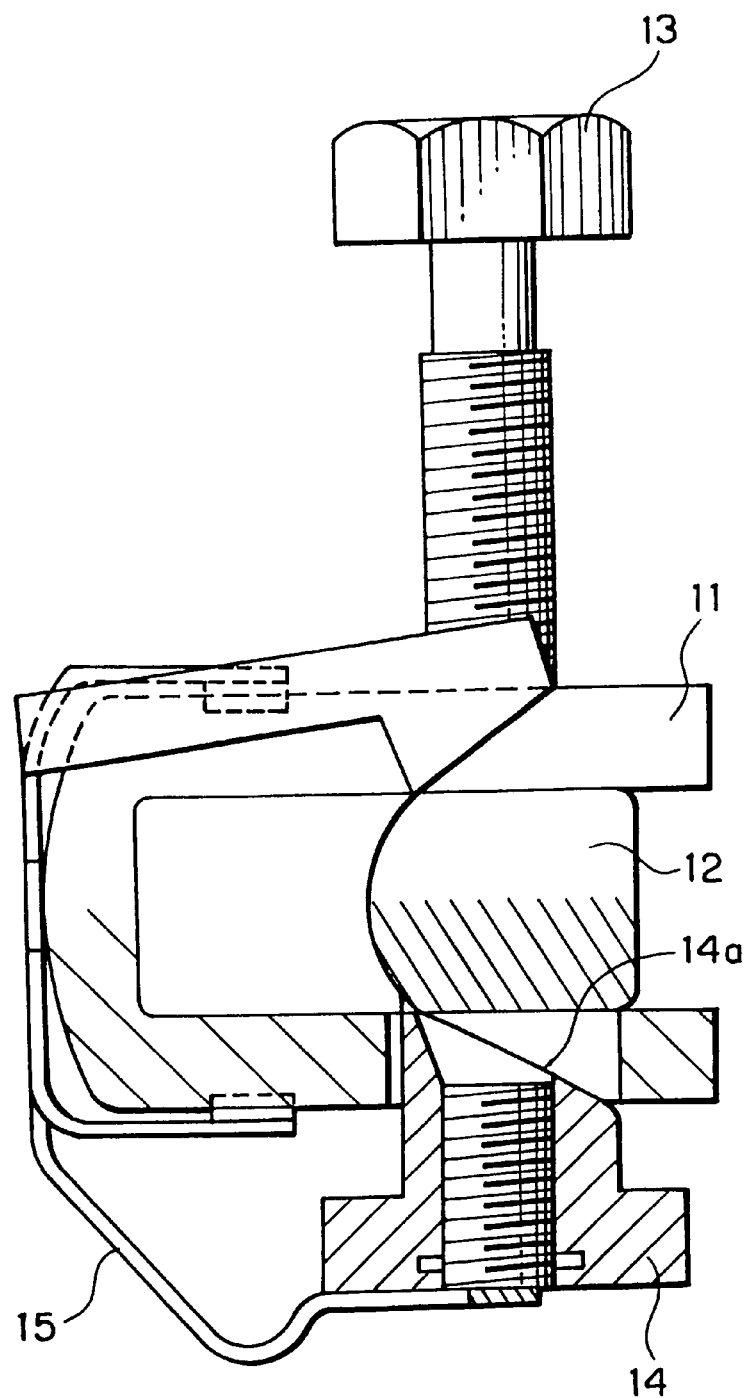
FIG. 41 is a cross-sectional view for showing the yoke 11 of FIG. 40, cut away in a direction perpendicular to the axis of the shaft 12.
Figure 42:
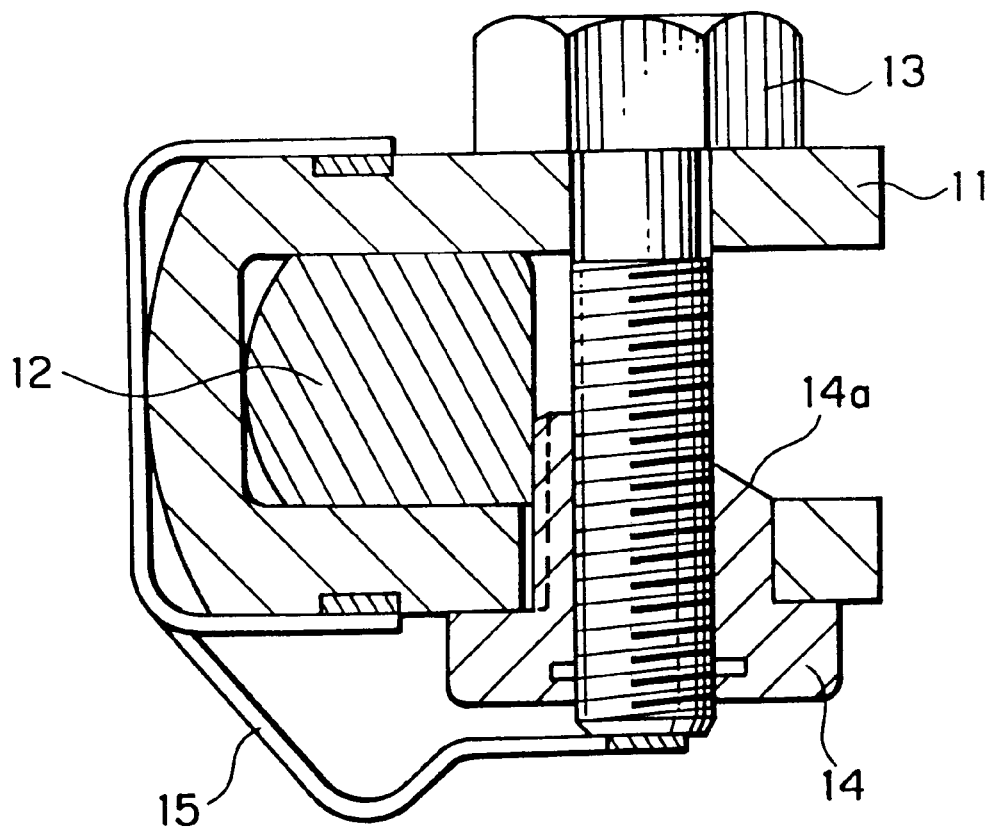
FIG. 42 is a cross-sectional view for showing the yoke 11 of FIG. 40, cut away in a direction perpendicular to the axis of the shaft 12.
Figure 43:
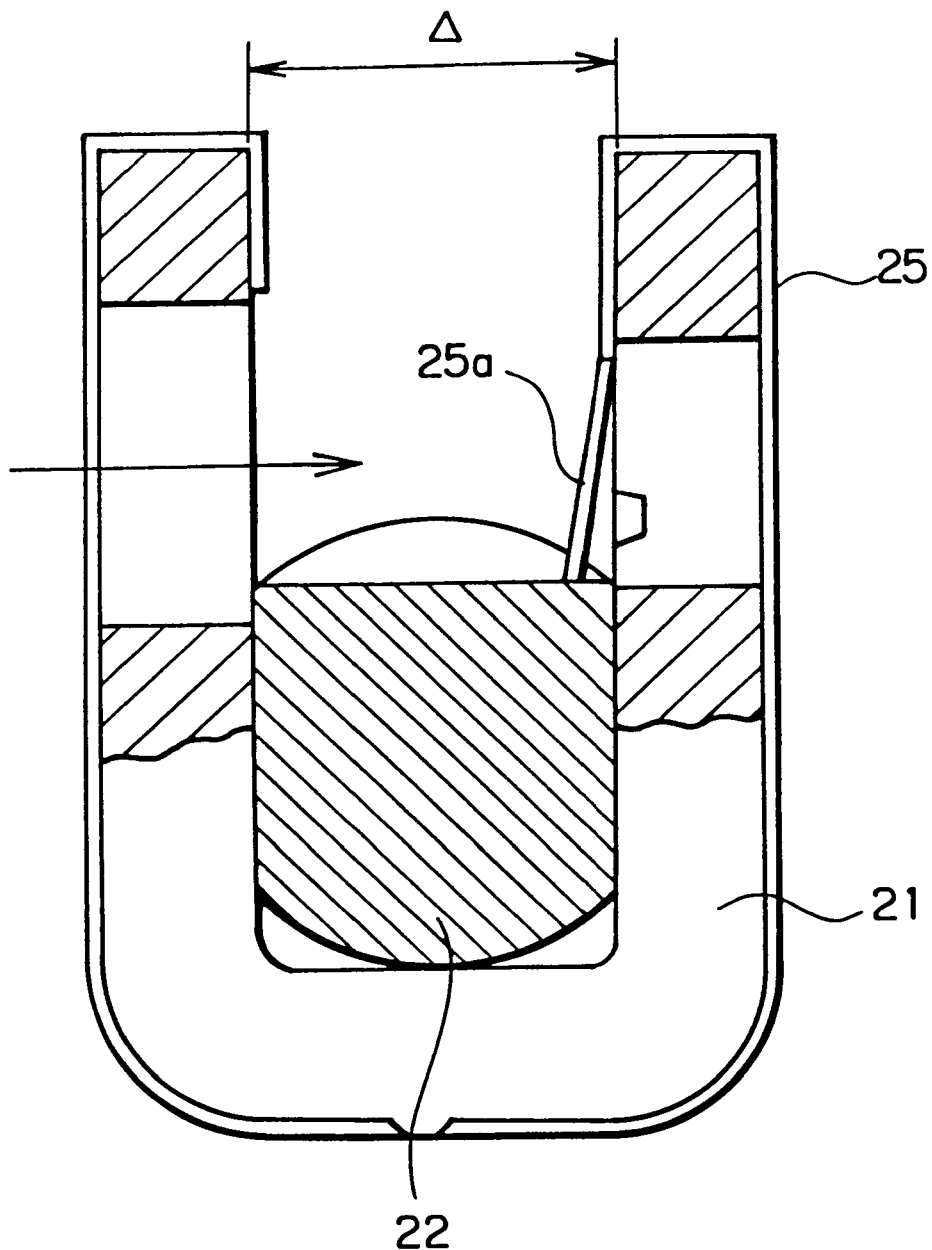
FIG. 43 is a view for showing an arrangement of the prior art which is disclosed in the U.S. Pat. No. 5,358,350, and is similar to that shown in FIGS. 41 and 42.

Next, description will be made on a temporary connection device for a universal joint according to the fifteenth embodiment of the present invention. FIG. 39 is a front view of a universal joint according to the fifteenth embodiment of the present invention.

According to the fifteenth embodiment, a nut C43 urged into a nut bore takes a square shape, a bore C42 of the clip main body C20 is formed in the surroundings of this square nut C43, and four projections C43 are formed to be engaged with the respective sides of this square nut C43.

Since the four projections C43 of the clip main body C20a are respectively engaged with the four sides of the square nut C43 as described above, the clip main body C20a can be securely fixed to the square nut C43. For this reason, when the shaft C1 is temporarily retained by the clip main body C20a, the rotation of the clip main body C20a can be securely prevented, so as to temporarily retain the shaft 1 securely.

It should be noted that since the nut C41 takes a square form, it is required to install the nut on the outer wall surface of the tab 7 by positioning. In addition, the leg portions C22, C23, C24 in the twelfth embodiment are not provided in the fifteenth embodiment.

As described above, according to the foregoing thirteenth to fifteenth embodiments, the clip does not easily fall off or disengage from the yoke due to the nut fixed in the nut bore of the tab, or because the clip main body is mounted on this nut.

What is claimed is:

1. A temporary connection device for a universal joint yoke and a shaft to be received in a U-shaped groove of the yoke, the U-shaped groove being formed by a bottom wall portion of the yoke and a pair of tabs extending from said bottom wall portion and provided with opposed bores to receive a fastening bolt, said temporary connection device comprising a clip to temporarily retain said shaft in said U-shaped groove of said yoke and being characterized in that:

said clip is composed of a resilient plate member having a support portion to be fixed to one of the tabs of said yoke and a latching member to extend into said U-shaped groove in a normal state, said latching member comprises an upper cam-slant portion which is brought into contact with said shaft when said shaft is inserted into said U-shaped groove from an open side thereof so as to substantially retract said latching member from said U-shaped groove by elastic deformation to allow said shaft to move into the U-shaped groove, and a shaft-engaging bottom portion to be returned into said U-shaped groove and positioned to block escape of said shaft through said open side of said U-shaped groove by engaging said shaft after said shaft is inserted into said U-shaped groove, with said shaft-engaging bottom portion extending longitudinally in a direction transverse to an axis of said shaft.

2. A temporary connection device according to claim 1, wherein said clip is comprised of a clip main body to extend along said bottom wall portion of said yoke and having first and second side walls t extend along said tabs, the first side wall of said clip main body has a portion for embracing part of the corresponding tab to constitute said support portion, the first and second side walls of said main body are respectively provided with bolt insertion openings for alignment with said bores, and said latching member is formed on said second side wall.

3. A temporary connection device according to claim 2, wherein one of said bolt insertion openings has inwardly projecting portions to temporarily retain the fastening bolt.

4. A temporary connection device according to claim 3, further comprising a nut formed with recesses for receiving said projecting portions for temporarily retaining the fastening bolt.

5. A temporary connection device according to claim 2, wherein there are provided sandwich pieces on the second side wall of the clip main body to sandwich the corresponding tab of the yoke.

6. A temporary connection device according to claim 2, wherein a bolt head portion suppressing member is formed on said second side wall.

7. A temporary connection device according to claim 2, wherein inwardly projecting portions are formed at one of said openings to engage a nut fitted on said fastening bolt.

8. A temporary connection device according to claim 1, further comprising said fastening bolt, said fastening bolt having a portion o non-circular cross section, and said non-circular portion of said bolt is adapted to urge said shaft against a bottom of said U-shaped groove in the assembled condition.

9. A temporary connection device according to claim 1, wherein said support portion is formed to embrace an end surface of said one tab.

10. A temporary connection device according to claim 1, including two parallel latching members each having a cam-slant portion and a shaft-engaging bottom portion as aforesaid.

11. A temporary connection device according to claim 1, further comprising said fatening bolt, said fastening bolt having a tapered portion, and said tapered portion being adapted to urge said shaft against a bottom of said U-shaped groove in an assembled state.

12. A temporary connection device according to claim 1, wherein said support portion includes an inverted U-shaped portion to embrace an end edge of said one tab.

13. A temporary connection device for a universal joint yoke and a shaft to be received in a U-shaped groove of the yoke, the U-shaped groove being defined by a bottom wall portion of the yoke and a pair of tabs extending from said bottom wall portion and provided with opposed bores to receive a fastening bolt, said temporary connection device including a clip to temporarily retain said shaft in said Us shaped groove of said yoke and being characterized in that:

said clip comprises a resilient plate member having a bottom and two side walls defining a U-shaped channel to receive a portion of said yoke that defines said U-shaped groove, a fixing portion to be fixed to one of the tabs of the received yoke portion, and a latching member bent from one of said side walls toward the other so as to have a major surface lying substantially in a plane that extends across said U-shaped channel, transverse to an axis of said channel, and said latching member has an upper cam-slant portion which is brought into contact with said shaft when said shaft is inserted into said U-shaped groove of the received yoke portion from an open side thereof so as to substantially retract said latching member from an insertion path of said shaft into said U-shaped groove by elastic deformation and thereby allow said shaft to move into said U-shaped groove, and a bottom portion that is positioned to block escape of said shaft through said open side of said U-shaped groove after said shaft has been inserted and said latching member has resiliently returned into said path.

14. A temporary connection device according to claim 13, wherein said latching member is bent from a side edge of said one side wall.

15. A temporary connection device according to claim 13, wherein said side walls have bolt insertion openings to align with said bores of said tabs, and said latching member is bent from a peripheral portion of the bolt insertion opening of said one side wall to extend through the bore of one of said tabs of said received yoke portion.

16. A temporary connection device according to claim 15, wherein said clip comprises a second latching member bent from a side edge of said other side wall toward said one side wall so as to have a major surface lying substantially in a plane that extends across said U-shaped channel, transverse to said axis of said channel, and said second latching member has an upper cam-slant portion which is brought into contact with said shaft when said shaft is inserted into said U-shaped groove of the received yoke portion from said open side thereof so as to substantially retract said latching second member from said insertion path of said shaft by elastic deformation and thereby allow said shaft to move into said U-shaped groove, and a bottom portion that is positioned to block escape of said shaft through said open side of said U-shaped groove after said shaft has been inserted and said second latching member has resiliently returned into said path.

17. A temporary connection device according to claim 16, wherein said fixing portion includes a inverted U-shaped support portion formed on a top portion of said other side wall and configured to embrace the other tab of said received yoke portion.

18. A temporary connection device according to claim 15, wherein said clip comprises a'second latching member bent from a side edge of said one side wall so as to have a major surface substantially opposed to said major surface of the first-mentioned latching member, and said second latching member has an upper can-slant portion which is brought into contact with said shaft when said shaft is inserted into said U-shaped groove of the received yoke portion from said open side thereof so as to substantially retract said second latching member from said insertion path of said shaft by elastic deformation and thereby allow said shaft to move into said U-shaped groove, and a bottom portion that is positioned to block escape of said shaft through said open side of said U-shaped groove after said shaft has been inserted and said second latching member has resiliently returned into said path, with a portion of said one tab being held between said latching members.

19. A temporary connection device according to claim 18, wherein said fixing portion includes an inverted U-shaped support portion formed on a top portion of one of said side walls and configured to embrace one of said tabs of said received yoke portion.

20. A temporary connection device according to claim 15, wherein one of said side walls is provided at opposite side edges thereof with bolt head retaining members disposed to engage a head of a fastening bolt inserted in said openings and bores, and thereby to prevent escape of the inserted bolt.

21. A temporary connection device according to claim 15, wherein one of said bolt insertion openings has inwardly projecting portions to temporarily retain said bolt.

22. A temporary connection device according to claim 21, further comprising a nut formed with recesses for receiving said projecting portions.

23. A temporary connection device according to claim 15, further comprising said bolt, said bolt having a portion of non-circular cross section, and said non-circular portion of said bolt being adapted to urge said shaft against a bottom of said U-shaped groove.

24. A temporary connection device according to claim 15, wherein inwardly projecting portions are formed at one of said openings to engage a nut fitted on said bolt.

25. A temporary connection device for a universal joint yoke and a shaft to be received in a U-shaped groove of said yoke, the U-shaped groove being formed by a bottom wall portion of said yoke and a pair of tabs extending from said bottom wall portion and provided with opposed bores to receive a fastening bolt, said temporary connection device comprising a resilient plate member having a substantially U-shaped main body including a bottom portion to extend along an outer surface of said bottom wall portion of said yoke, and first and second side walls connected by said bottom portion to extend along outer surfaces of said tabs, said first and second side walls of said main body being respectively formed therethrough with bolt insertion openings to align with said bores of said tabs, characterized in that:

said first side wall is formed at a top end thereof with an inverse U-shaped support portion extending toward said second side wall and configured to embrace an end of one of said tabs;

said first side wall is formed at a side edge thereof with a first latching member extending toward said second side wall and protruded into a path through which said shaft passes when inserted into said U-shaped groove from an open side thereof, and said first latching member is formed with a cam-slant portion which is brought into contact with said shaft when said shaft is inserted into said U-shaped groove from said open side thereof so as to substantially retract said first latching member out of said path by elastic deformation to allow said shaft to move into said U-shaped groove, and with a latching surface portion to latch said shaft in said U-shaped groove after said shaft has been inserted into said U-shaped groove and said first latching member has been resiliently returned into said path.

26. A temporary connection device according to claim 25, wherein:

said second side wall is formed at a peripheral portion of the corresponding bolt insertion opening with a second latching member to protrude into said U-shaped groove through the bore of the corresponding tab, said second latching member being formed with a cam-slant portion which is brought into contact with said shaft when said shaft is inserted into said U-shaped groove from said open side thereof to substantially retract said second latching member from said U-shaped groove by elastic deformation to allow said shaft to move into said U-shaped groove, and with a latching surface portion to latch said shaft in said U-shaped groove, in cooperation with said first latching member, after said shaft has been inserted into said U-shaped groove and said second latching member has been resiliently returned into said U-shaped groove, with a portion of said yoke being held between said first and second latching members.

27. A temporary connection device according to claim 26, wherein:

said second side wall is formed at opposite side edges thereof with bolt head retaining members disposed to engage a head of the bolt inserted into said openings and bores, and thereby to prevent escape of the inserted bolt.

28. A temporary connection device according to claim 25, wherein:

said second side wall is provided at opposite side edges thereof with bolt head retaining members disposed to engage a head of the bolt inserted into said openings and bores, and thereby to prevent escape of the inserted bolt.

29. A temporary connection device for a universal joint yoke and a shaft to be received in a U-shaped groove of said yoke, the U-shaped groove being formed by a bottom wall portion of said yoke and a pair of tabs extending from said bottom wall portion and provided with opposed bores to receive a fastening bolt, said temporary connection device comprising a resilient plate member having a substantially U-shaped main body including a bottom portion to extend along an outer surface of said bottom wall portion of said yoke, first and second side walls connected by said bottom portion to extend along outer surfaces of said tabs, and said first and second side walls of said main body being respectively formed therethrough with bolt insertion openings to align with said bores of said tabs, characterized in that:

said first side wall is formed at a side edge thereof with a first latching member extending toward said second side wall and protruded into a path through which said shaft passes when inserted into said U-shaped groove from an open side thereof;

said first latching member is formed with a cam-slant portion which is brought into contact with said shaft when said shaft is inserted into said U-shaped groove from said open side thereof so as to substantially retract said first latching member out of said path by elastic deformation to allow said shaft to move into said U-shaped groove, and with a latching surface portion to latch said shaft in said U-shaped groove after said shaft has been inserted into said U-shaped groove and said first latching member has been resiliently returned into said path; and said second side wall is formed at a peripheral portion of the corresponding bolt insertion opening with a second latching member to protrude into said U-shaped groove through the bore of the corresponding tab, said second latching member being formed with a cam-slant portion which is brought into contact with said shaft when said shaft is inserted into said U-shaped groove from said open side thereof to substantially retract said second latching member from said U-shaped groove by elastic deformation to allow said shaft to move into said c-shaped groove, and with a latching surface portion to latch said shaft in said U-shaped groove, in cooperation with said first latching member, after said shaft has been inserted into said U-shaped groove and said second latching member has been resiliently returned into said U-shaped groove, with a portion of said yoke being held between said first and second latching meters.

30. A temporary connection device according to claim 29, wherein:
    said second side wall is formed at opposite side edges thereof with bolt head retaining members disposed to engage a head of the bolt inserted into said openings and bores, and thereby to prevent escape of the inserted bolt.

31. A temporary connection device for a universal joint yoke and a shaft to be received in a U-shaped groove of said yoke, the U-shaped groove being formed by a bottom wall portion of said yoke and a pair of tabs extending from said bottom wall portion and provided with opposed bores to receive a fastening bolt, said temporary connection device comprising a resilient plate member having a substantially U-shaped main body including a bottom portion to extend along an outer surface of said bottom wall portion of said yoke, first and second side walls connected by said bottom portion to extend along outer surfaces of said tabs, and said first and second side walls of said main body being respectively formed therethrough with bolt insertion openings to align with said bores of said tabs, characterized in that:
    said first side wall is formed at a top end thereof with an inverse U-shaped support portion extending toward said second side wall and configured to embrace an end of one of said tabs; and
    said second side wall is formed at opposite side edges thereof with bolt head retaining members disposed to engage a head of the bolt inserted into said openings and bores, and thereby to prevent escape of the inserted bolt.

* * * * *